United States Patent [19]

Yamada et al.

[11] Patent Number: 5,542,899

[45] Date of Patent: Aug. 6, 1996

[54] MULTISPINDLE-HEAD MACHINE TOOL

[75] Inventors: Ichiho Yamada; Tomoyoshi Miyagi; Shoji Nezuka; Satoru Ichihashi; Hiroshi Isozaki, all of Sayama, Japan

[73] Assignee: Honda Giken Kogyo Kabushiki Kaisha, Tokyo, Japan

[21] Appl. No.: 350,629

[22] Filed: Dec. 7, 1994

[30] Foreign Application Priority Data

| Dec. 8, 1993 | [JP] | Japan | 5-308076 |
| Dec. 8, 1993 | [JP] | Japan | 5-308085 |
| Dec. 8, 1993 | [JP] | Japan | 5-308094 |
| Oct. 24, 1994 | [JP] | Japan | 6-258359 |
| Oct. 24, 1994 | [JP] | Japan | 6-258360 |

[51] Int. Cl.⁶ ................................. B23Q 3/157
[52] U.S. Cl. ................. 483/32; 483/51; 483/66
[58] Field of Search .................... 483/32, 54, 55, 483/56, 68, 66, 51, 1

[56] References Cited

U.S. PATENT DOCUMENTS

| 3,760,472 | 9/1973 | Kielma et al. | 29/40 |
| 4,110,897 | 9/1978 | Hipweli et al. | 483/51 X |
| 4,125,932 | 11/1978 | Kielma et al. | 483/32 |
| 4,216,572 | 8/1980 | Matsushita et al. | 483/32 |
| 4,510,669 | 4/1985 | Ida et al. | 483/32 |
| 4,776,081 | 10/1988 | Okunishi et al. | 483/56 X |
| 4,877,268 | 4/1989 | Jaissie et al. | 483/32 |

FOREIGN PATENT DOCUMENTS

| 5852003 | 11/1980 | Japan . | |
| 295106 | 12/1988 | Japan | 483/32 |
| 1119820 | 10/1984 | U.S.S.R. | 483/32 |
| 1331629 | 8/1987 | U.S.S.R. | 483/32 |

*Primary Examiner*—William Briggs
*Attorney, Agent, or Firm*—Birch, Stewart, Kolasch & Birch, LLP

[57] ABSTRACT

A multispindle-head machine tool has a column, a plurality of multispindle heads each having a plurality of tools and an engaging member and an annular feed passageway supporting the multispindle heads for circulatory movement therealong. The annular feed passageway includes a pair of upper and lower fixed guide members supported on the column, and a movable guide member movable back and forth horizontally for interconnecting ends of the upper and lower fixed guide members near a machining position. A rotary actuator is provided together with a feed mechanism disposed around the annular feed passageway and movable to circulate along the annular feed passageway by the rotary actuator for moving the multispindle heads along the annular feed passageway. An actuator unit is mounted on the column in association with the movable guide member for positioning one of the multispindle heads which is held on the movable guide member in the machining position, and rotating the tools of one of the multispindle heads. A jig table is mounted on a side of the column and horizontally movable back and forth. The jig table includes an attachment jig for supporting a workpiece to be machined by the tools of one of the multispindle heads.

12 Claims, 19 Drawing Sheets

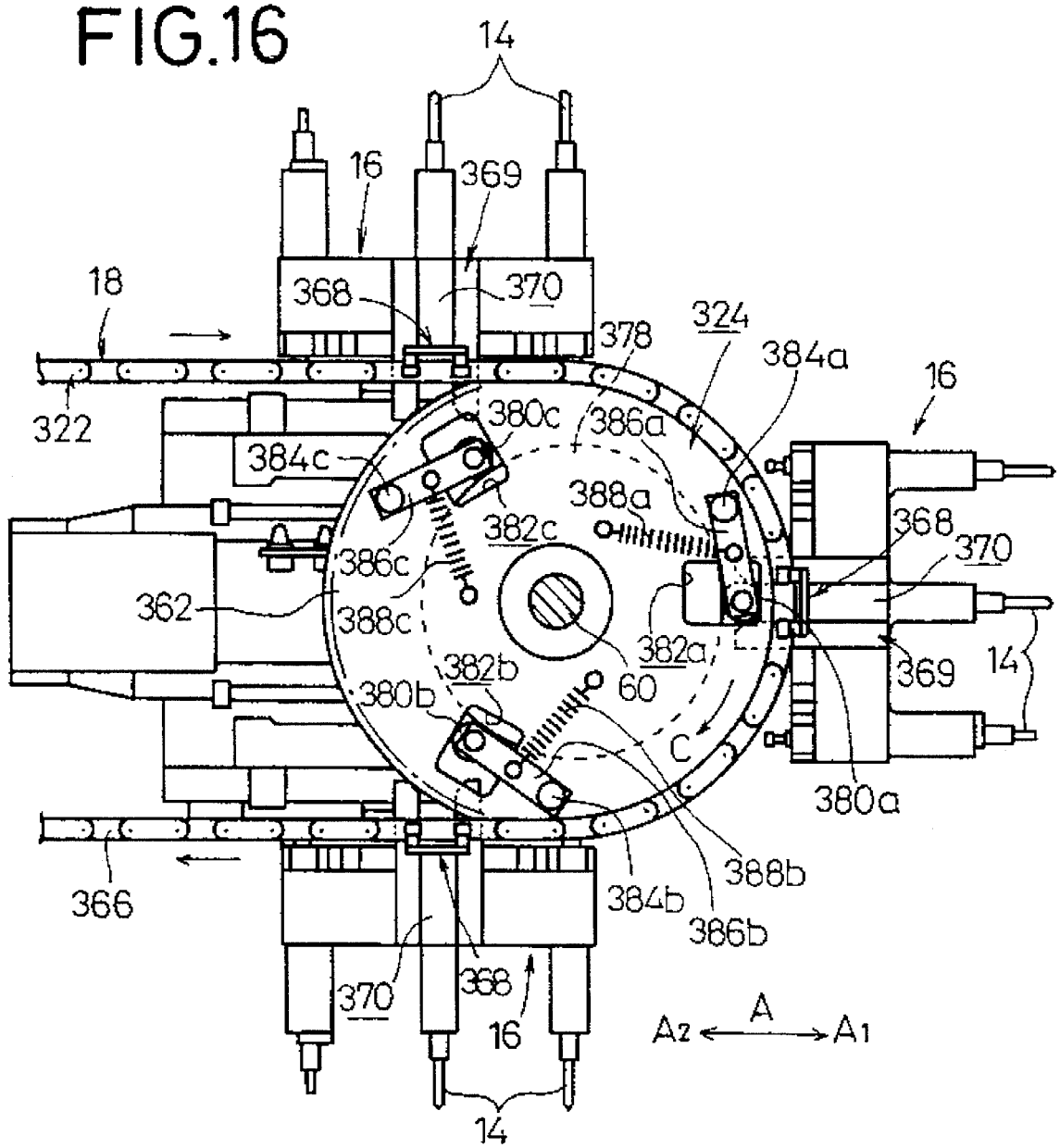

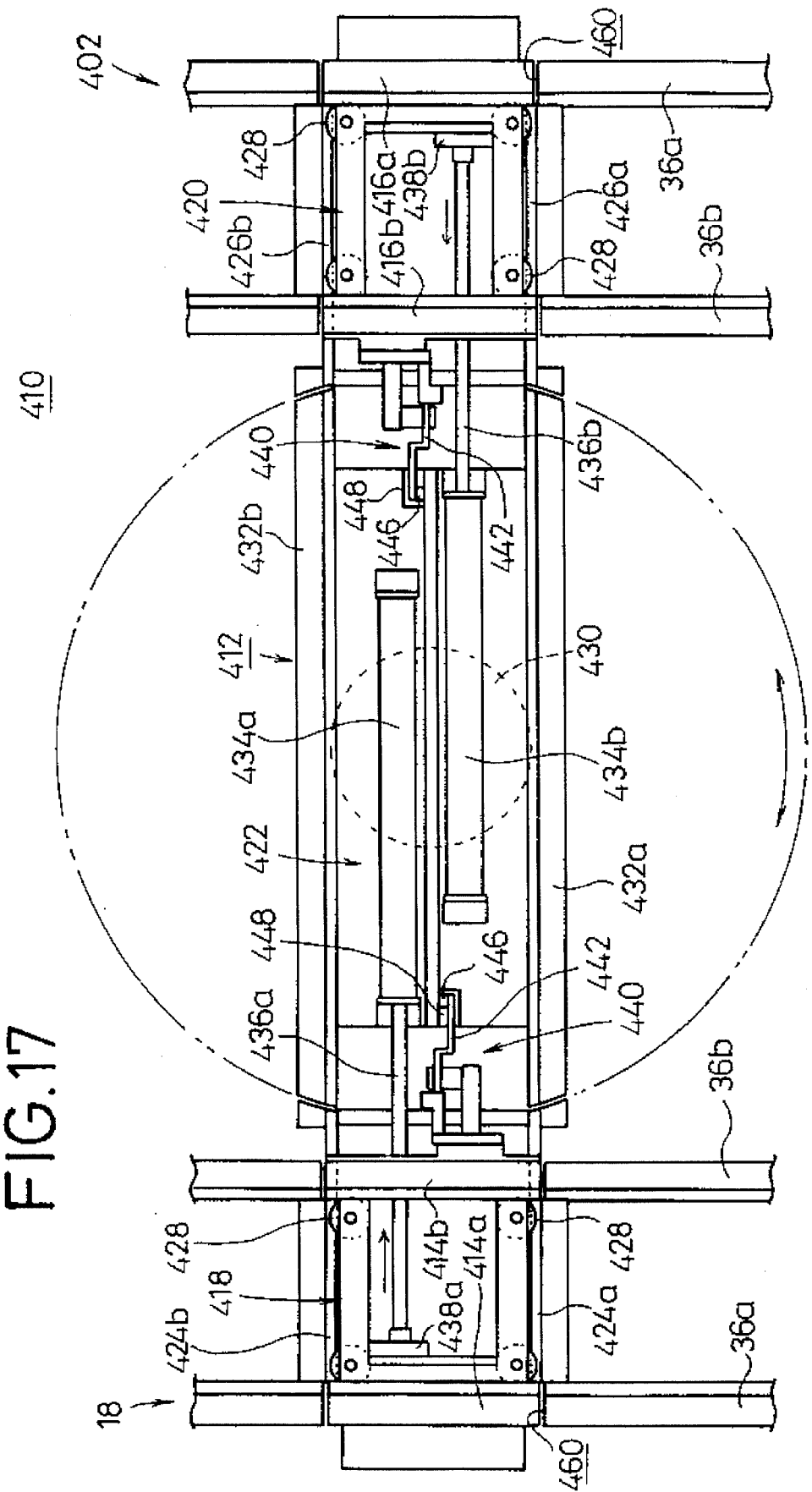

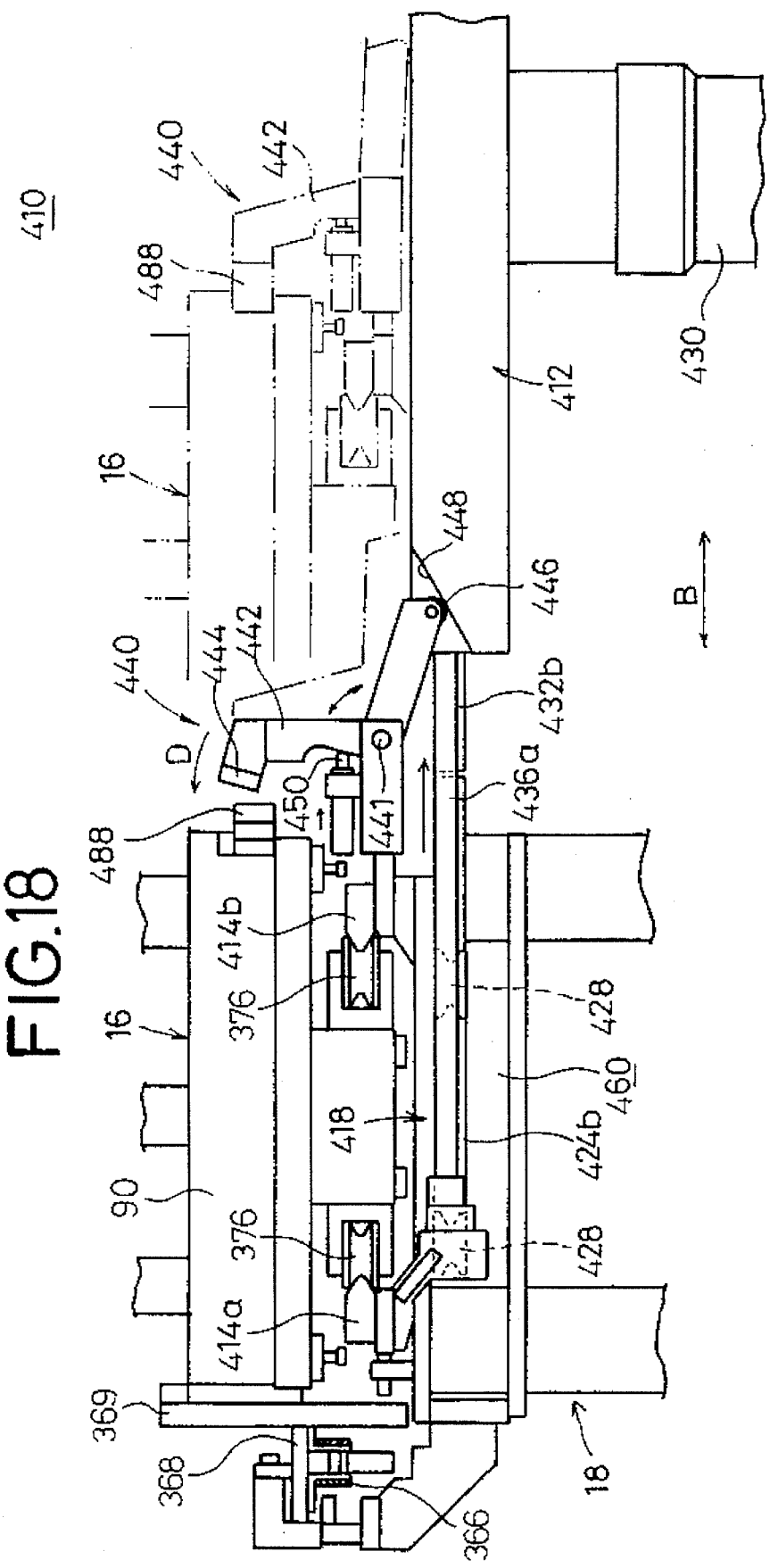

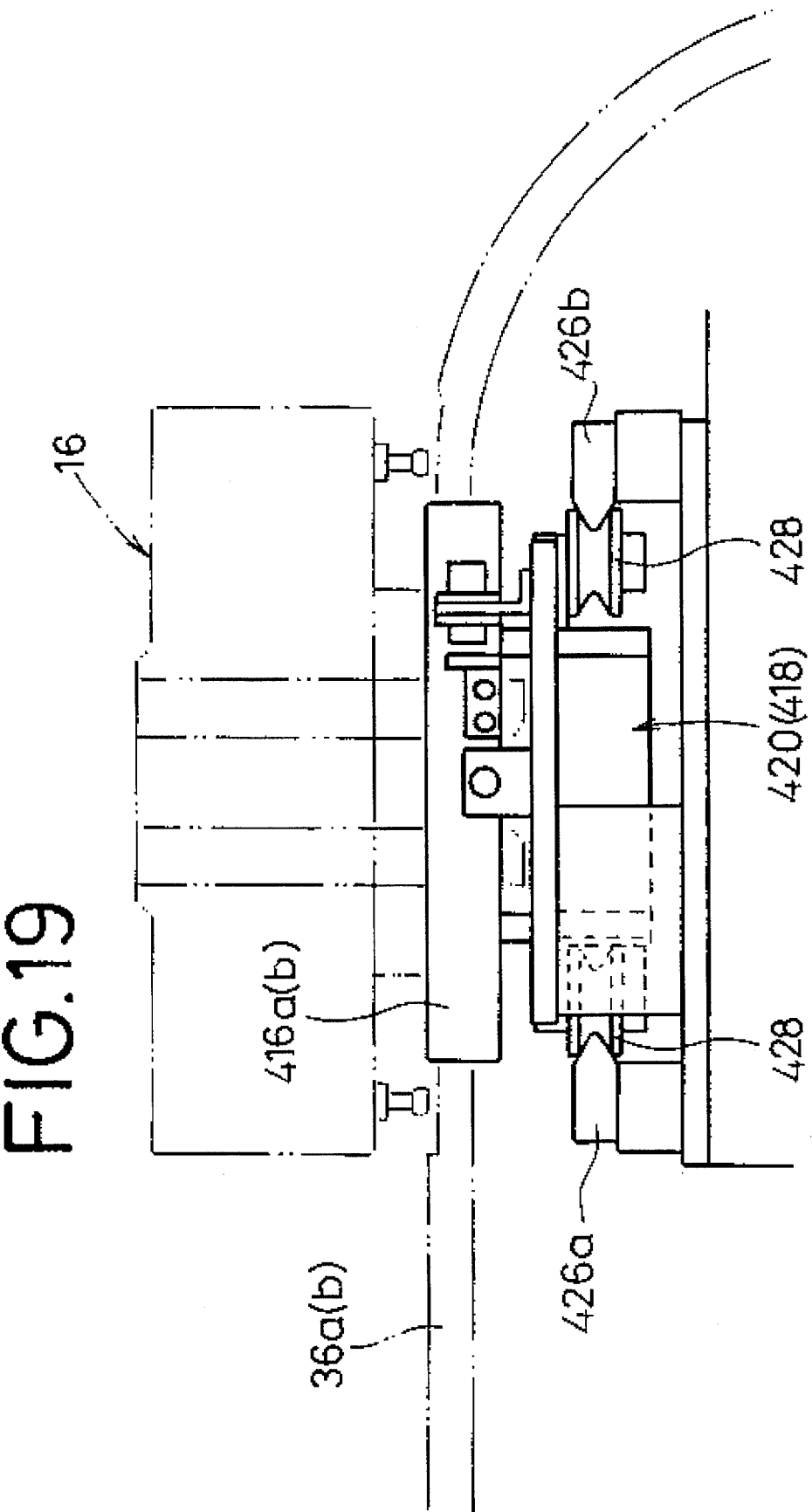

MULTISPINDLE-HEAD MACHINE TOOL

BACKGROUND OF THE INVENTION

1. Field of the Invention

The present invention relates to a multispindle-head machine tool for bringing one of a plurality of multispindle heads into a machining position and operating an actuator unit to drive a plurality of tools of the multispindle head in the machining position.

2. Description of the Related Art

Multispindle-head machine tools having a plurality of multispindle heads each with a plurality of tools for simultaneously effecting different machining processes have heretofore been in widespread usage. In order to machine various different workpieces, a known multispindle-head machine tool has a plurality of multispindle heads, and a desired one of the multispindle heads is put in a machining position to machine the workpieces simultaneously. Since the multispindle heads are usually fed in a horizontal circulatory feed passageway, the multispindle-head machine tool is considerably large in overall size.

Japanese utility model publication No. 58-52003, for example, discloses an apparatus which has a turret head rotatable about a support shaft that is inclined 45° to the horizon. The turret head has a plurality of tool head rests each supporting a multispindle head mounted thereon. When the turret head is angularly moved a certain angle, one of the multispindle heads is positioned in a horizontal machining attitude while the other multispindle heads are positioned in a vertical exchanging attitude.

In the known multispindle-head machine tool, a desired multispindle head has to be removed from the circulatory feed passageway along which the multispindle heads are successively fed, and to be installed on an actuator which is located at the machining position. Therefore, the process of exchanging multispindle heads is complex, lowering the efficiency of the machine tool especially when many different machining processes are required to be carried out on workpieces.

According to the above publication, the multispindle heads are successively oriented from the horizontal direction to the vertical direction as the turret head rotates. Therefore, if chips or a machining fluid produced in a machining process is applied to the multispindle head in the machining position, then the chips or the machining fluid tends to enter the multispindle head after the machining process. This is because when the tools stop rotating, the internal pressure of the multispindle head decreases as the temperature drops, tending to draw in the machining fluid applied to external spindles through seals of the spindles. As a result, the lubricant oil in the multispindle head is mixed with the introduced machining fluid.

If chips are applied to tools of the multispindle heads, then workpieces may suffer machining failures because of the chips when they are machined by these tools.

A jig table for holding workpieces is reciprocally movable along a horizontal plane on a column. Chips and a machining fluid are liable to be applied to the jig table, and the machining fluid finds its way into sliding areas in a linear guide and a rotary table, tending to adversely affect the lubricant oil.

According to the above publication, furthermore, a pair of arms on a multispindle head changer turns 180° while gripping tool heads above the machine tool and a magazine. Since the space required for the arms to turn in is large, the multispindle head changer itself is considerably large in size.

SUMMARY OF THE INVENTION

It is therefore an object of the present invention to provide a multispindle-head machine tool which is capable of feeding a plurality of multispindle heads along an annular circulating feed passageway, positioning and anchoring a desired multispindle head quickly and highly accurately in a machining position, and effectively preventing chips and a machining fluid from being applied to the multispindle heads and a jig table.

Another object of the present invention is to provide an automatic multispindle head changer which occupies a relatively small space and can change multispindle heads efficiently in a short period of time.

To achieve the above objects, there is provided in accordance with the present invention a multispindle-head machine tool comprising a column, a plurality of multispindle heads each having a plurality of tools and an engaging member, an annular feed passageway supporting the multispindle heads for circulatory movement therealong, the annular feed passageway having a pair of upper and lower fixed guide members supported on the column, and a movable guide member movable back and forth horizontally for interconnecting ends of the upper and lower fixed guide members near a machining position, a rotary actuator, feed means disposed around the annular feed passageway and movable in a circulating manner along the annular feed passageway by the rotary actuator for moving the multispindle heads along the annular feed passageway, an actuator unit mounted on the column in association with the movable guide member for positioning one of the multispindle heads which is held on the movable guide member in the machining position, and rotating the tools of said one of the multispindle heads, and a jig table mounted on a side of the column and horizontally movable back and forth, the jig table having an attachment jig for supporting a workpiece to be machined by the tools of said one of the multispindle heads.

The feed means may comprise a toothed member rotatable by the rotary actuator, a circulatory member movable in a circulating manner in engagement with the toothed member, and a plurality of feed members engageable with the respective engaging members of the multispindle heads for moving the multispindle heads in a circulating manner with the feed members disengageable from the engaging members.

The actuator unit may comprise temporary positioning means for engaging the engaging member of said one of the multispindle heads to temporarily position said one of the multispindle heads in the machining position when the movable guide is horizontally moved inwardly out of the annular feed passageway.

The temporary positioning means may comprise a temporary positioning pin fixed to the column near the movable guide member for engagement with the engaging member of said one of the multispindle heads when said one of the multispindle heads is moved in unison with the movable guide member inwardly out of the annular feed passageway.

The temporary positioning means may comprise a cam plate fixed to the column near the movable guide member, and a cam follower swingably supported on a side of the toothed member and held in contact with the cam plate for engaging the engaging member of said one of the multispindle heads when the toothed member rotates.

The actuator unit may comprises a clamp mechanism for securely positioning said one of the multispindle heads with respect to the column, the clamp mechanism comprising a cylinder unit for moving the movable guide member inwardly out of and outwardly into the annular feed passageway, taper means for centering said one of the multispindle heads with respect to the column, and stud pulling means for fixing said one of the multispindle heads to the column.

The taper means may comprise a plurality of tapered portions disposed on respective four corners of a rear surface of said one of the multispindle heads opposite to a front surface thereof on which the tools are mounted, and a plurality of tapered holes defined in the column for receiving the tapered portions, respectively.

The pulling means may comprise a plurality of studs disposed on respective four corners of a rear surface of said one of the multispindle heads opposite to a front surface thereof on which the tools are mounted, a plurality of sets of balls mounted in the column for engagement with respective necks of the studs, and a plurality of pistons for moving the sets of balls radially with respect to the studs, respectively.

The jig table may comprise a rotary base with the attachment jig mounted thereon, and a drive motor for rotating the rotary base to index the workpiece.

In the multispindle-head machine tool, two sets of the annular feed passageway, the feed means, the actuator unit, and the jig table may be mounted symmetrically on opposite sides of the column.

The multispindle-head machine tool may further comprises a stock device having a stock annular feed passageway extending parallel to and substantially identical in structure to the annular feed passageway, and an automatic multispindle head exchanger mechanism disposed between the annular feed passageway and the stock annular feed passageway for exchanging multispindle heads, the automatic multispindle head exchanger mechanism comprising a turntable disposed between the annular feed passageway and the stock annular feed passageway, first and second carriages normally positioned at respective opposite ends of the turntable and serving as part of the annular feed passageway and the stock annular feed passageway, respectively, each of the first and second carriages having guide members for supporting a multispindle head, and transfer means mounted on the turntable for simultaneously moving the first and second carriages with respective multispindle heads supported in different directions toward a center of the turntable.

The automatic multispindle head exchanger mechanism may further comprise positioning means for positioning the multispindle heads supported on the first and second carriages when the first and second carriages are moved toward the center of the turntable by the transfer means, the positioning means comprising a hook mounted on each of the multispindle heads, and an engaging member mounted on each of the first and second carriages for engaging the hook in coaction with the turntable.

In the multispindle-head machine tool of the above arrangement, since the multispindle heads are moved in a circulating manner along the parallel fixed guide members and movable guide member, i.e., in a vertical plane, a space required to stock the multispindle heads does not extend horizontally, and hence the space occupied by the multispindle-head machine tool is greatly reduced.

After a desired multispindle head has been positioned with respect to the movable guide member, the multispindle head is positioned in the machining position by the actuator unit, and the tools thereof are rotated to machine the workpiece in the machining position. The desired multispindle head can thus be placed quickly and easily in the machining position for efficiently effecting various machining operations.

The feed means has the feed members engageable with the respective engaging members of the multispindle heads for moving the multispindle heads in a circulating manner, and a desired one of the multispindle heads can easily be released from the feed means. Consequently, a multispindle head mounted on an indexing feed device and a multispindle head mounted on a stock device or the like can easily and automatically be exchanged with each other.

After having machined the workpiece, the multispindle head is moved from the movable guide member onto the lower fixed guide members, orienting the mounted tools downwardly. Accordingly, chips and/or a machining fluid that has been applied to the multispindle head drop by gravity along the downwardly directed tools, and hence is reliably removed from the multispindle head, but does not enter the multispindle head. Inasmuch as the jig table is mounted on the side of the column for movement back and forth, chips and/or a machining fluid is prevented from being deposited on the jig table.

The actuator unit and the jig table are mounted on the same column. Therefore, the relative positions of the actuator unit and the jig table remain unchanged when cooled by the machining fluid supplied during a machining process, so that the workpiece can be machined highly accurately at all times.

The rotary base with the attachment jig and the drive motor for rotating the rotary base are mounted on the jig table. Therefore, the workpiece held by the attachment jig can easily be converted into a desired attitude.

In the multispindle-head machine tool, the multispindle heads are circulatingly fed along the annular feed passageway by the feed mechanism. When one of the multispindle heads is moved onto the movable guide member, the cam follower which rotates with the toothed member is guided by the cam plate to engage the engaging member of the multispindle head. Therefore, the weight of the multispindle head is prevented from acting directly on the feed mechanism. The multispindle head can reliably be supported, and can accurately temporarily be positioned with respect to the movable guide member.

After certain multispindle heads, to be exchanged with each other, are circulated to be fed on the annular feed passageway and the stock annular feed passageway are supported on the guide members of the first and second carriages, the first and second carriages are transferred to the center of the turntable by the transfer means. Then, the turntable is turned 180°, and thereafter the multispindle heads are moved onto the stock annular feed passageway and the annular feed passageway. Consequently, these multispindle heads are newly placed on the annular feed passageway and the stock annular feed passageway through the above simple process. Therefore, a space required for the turntable to turn therein is greatly reduced, and the automatic multispindle head exchanger mechanism can be reduced in size and simplified in structure in its entirety. Because the multispindle heads are fed toward the center of the turntable, it is possible to turn the turntable at a relatively high speed even if the multispindle heads are considerably heavy because the centers of gravity of the multispindle heads are located near the center of turning movement of the turntable and hence the inertia of the turntable is reduced. This allows the multispindle heads to be exchanged with each other quickly and efficiently.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 16 is a front elevational view of a temporary positioning mechanism of the multispindle-head machine tool shown in FIG. 14;

FIG. 17 is a plan view, partly omitted from illustration, of an automatic multispindle-head changer in the multispindle-head machine tool according to a fourth embodiment of the present invention;

FIG. 18 is a front elevational view, partly omitted from illustration, of the automatic multispindle-head changer shown in FIG. 17; and FIG. 19 is a view of a carriage of the automatic multispindle head changer shown in FIG. 17.

DETAILED DESCRIPTION OF THE PREFERRED EMBODIMENTS

Figure 1:
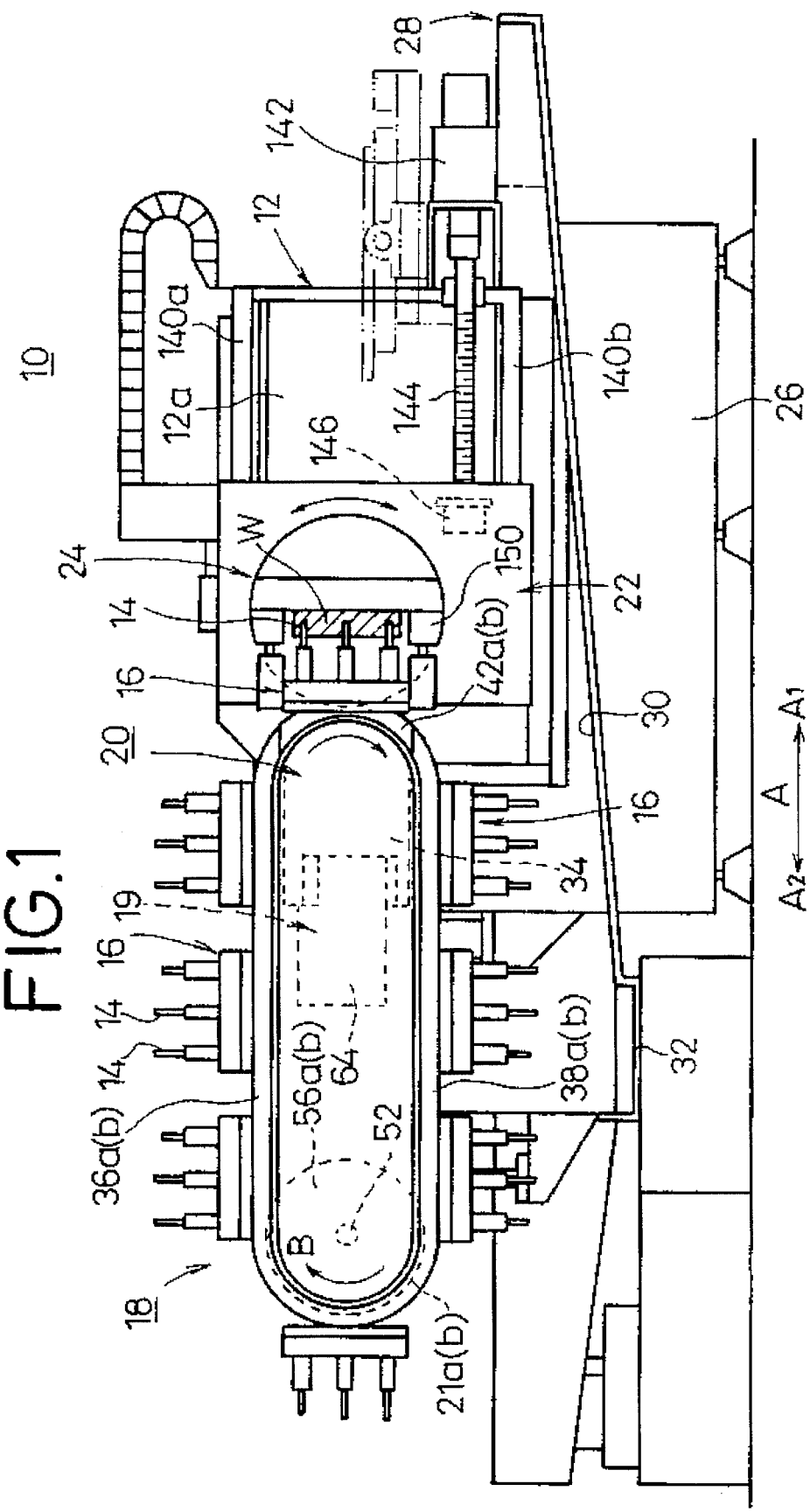
FIG. 1 is a schematic front elevational view of a multispindle-head machine tool according to a first embodiment of the present invention.
Figure 2:
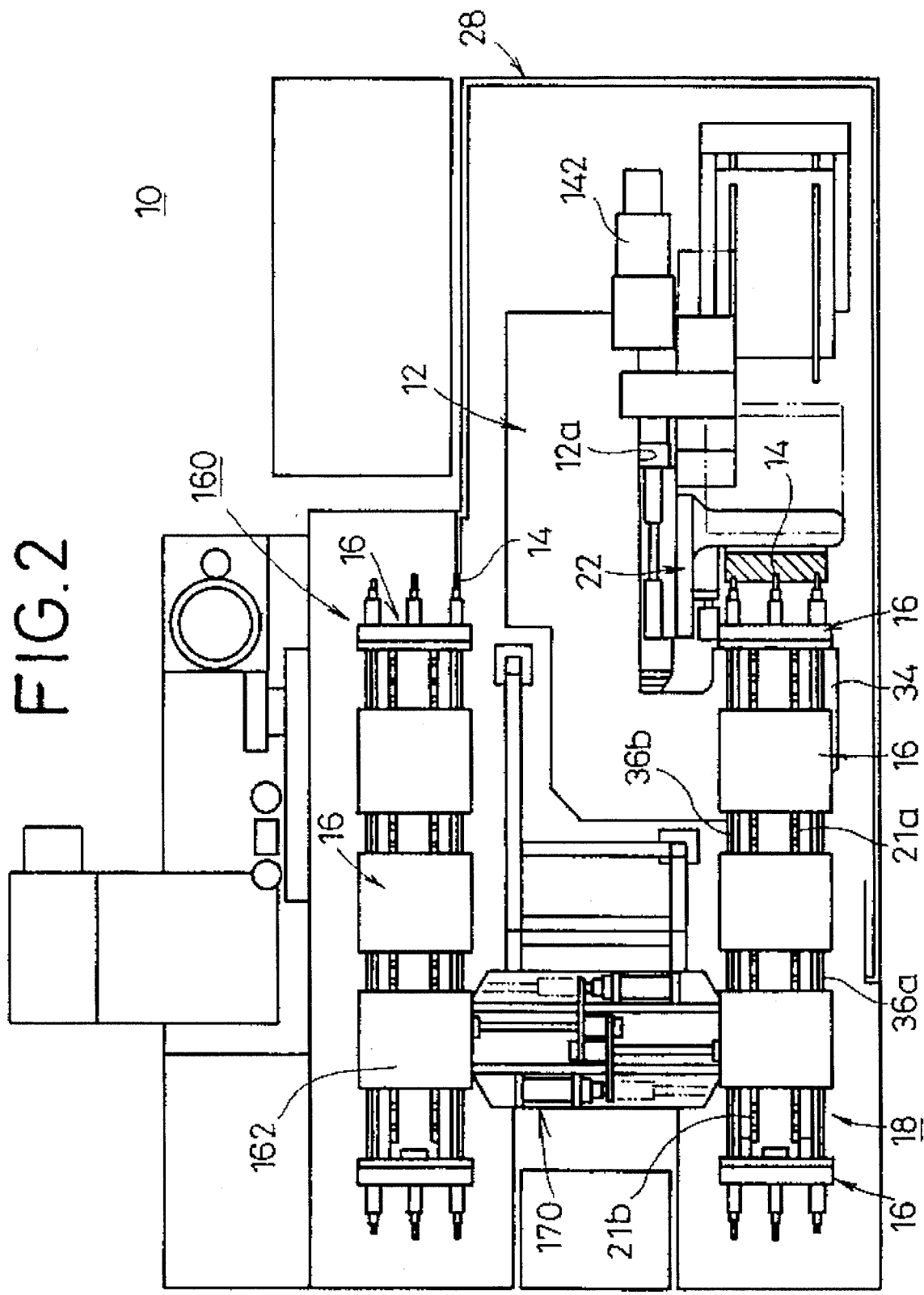
FIG. 2 is a schematic plan view of the multispindle-head machine tool shown in FIG. 1.
Figure 3:
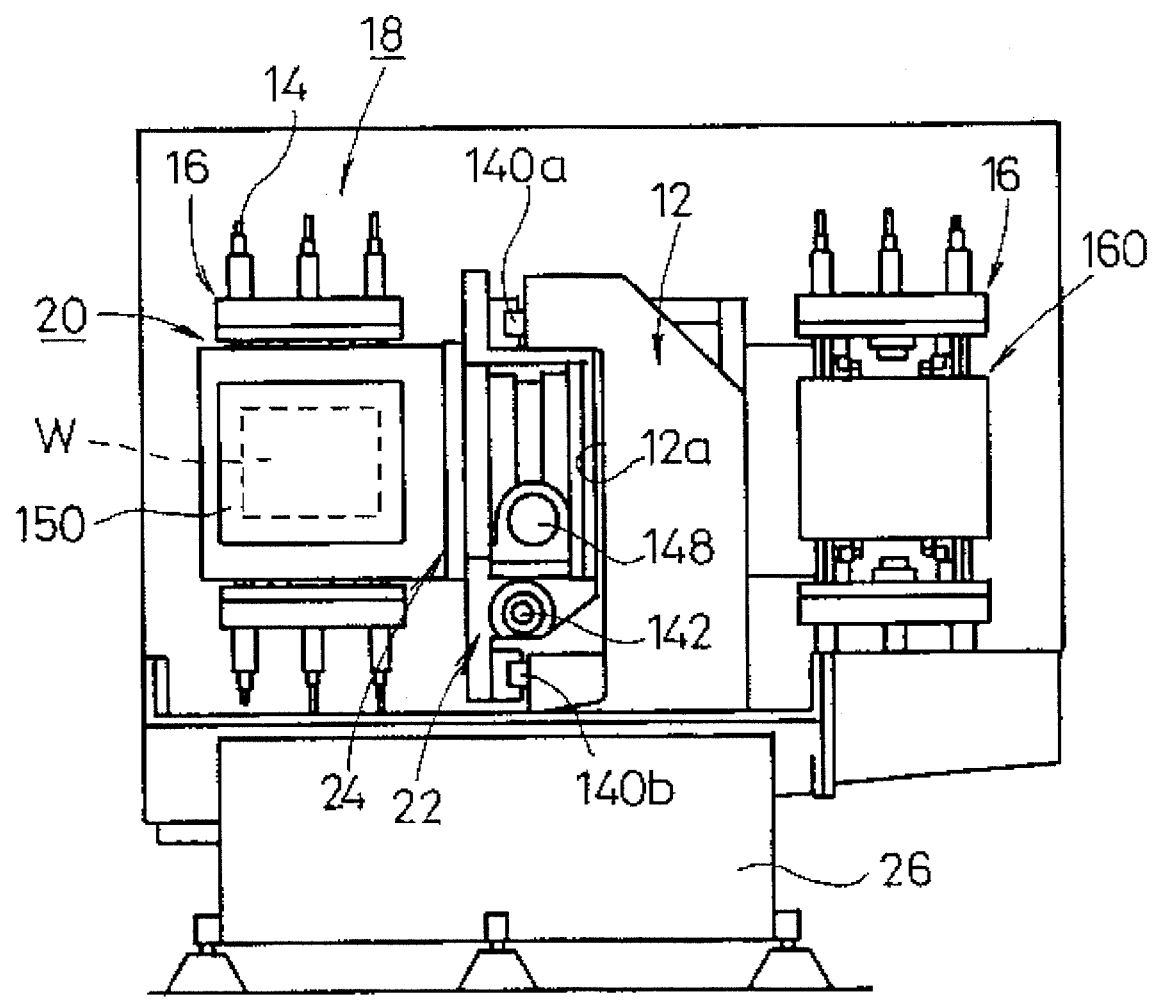
FIG. 3 is a schematic side elevational view of the multispindle-head machine tool shown in FIG. 1.

1st Embodiment:

FIGS. 1 through 3 show a multispindle-head machine tool 10 according to a first embodiment of the present invention. The multispindle-head machine tool 10 comprises a column 12, an annular feed passageway 18 for circulatingly feeding a plurality of multispindle heads 16 each having a plurality of tools 14 along a vertical plane, an actuator mechanism 19 for rotating the tools 14 mounted on any one of the multispindle heads 16 in a machining position, a pair of chains (feed means) 21a, 21b (see FIGS. 4 and 5) engaging the multispindle heads 16 for circulatory movement along the annular feed passageway 18, a clamp mechanism 20 for positioning and anchoring a desired one of the multispindle heads 16 with respect to the column 12, a jig table 22 mounted on a side 12a of the column 12 for back-and-forth movement in the horizontal directions indicated by the arrow A, and a rotary jig 24 mounted on the jig table 22 for attachment of a workpiece W. The actuator mechanism 19 and the clamp mechanism 20 jointly serve as an actuator unit.

Figure 4:
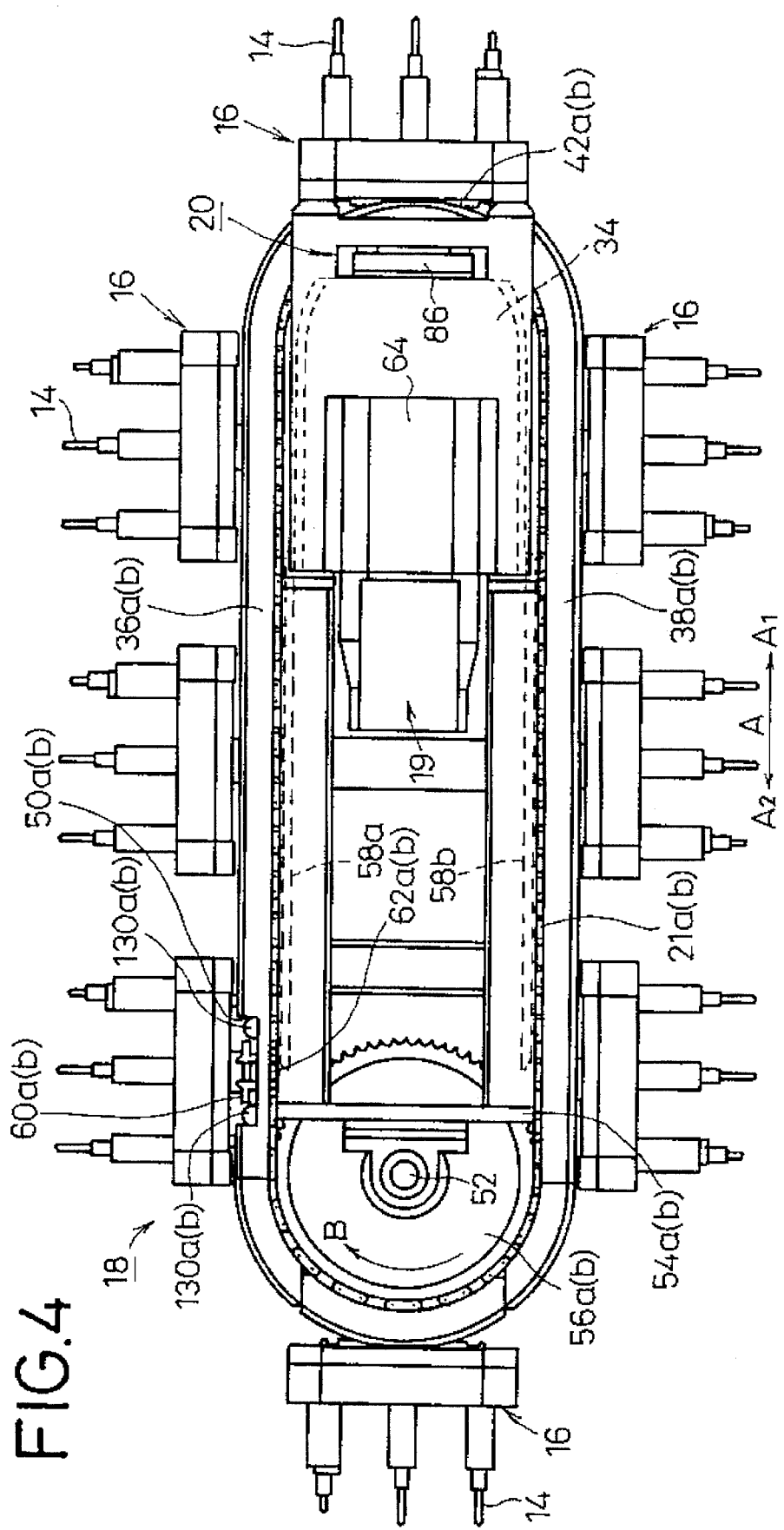
FIG. 4 is a front elevational view of an annular feed passageway and a clamp mechanism of the multispindle-head machine tool shown in FIG. 1.
Figure 5:
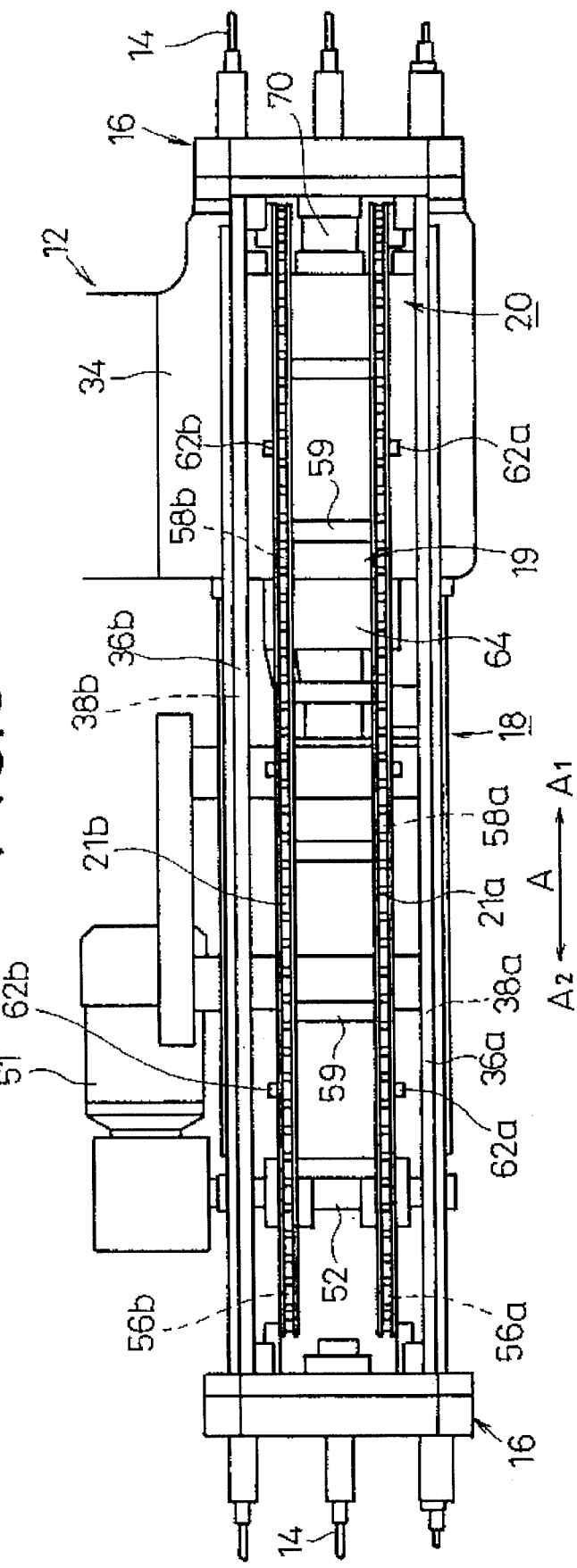
FIG. 5 is a plan view of the annular feed passageway and the clamp mechanism.
Figure 6:
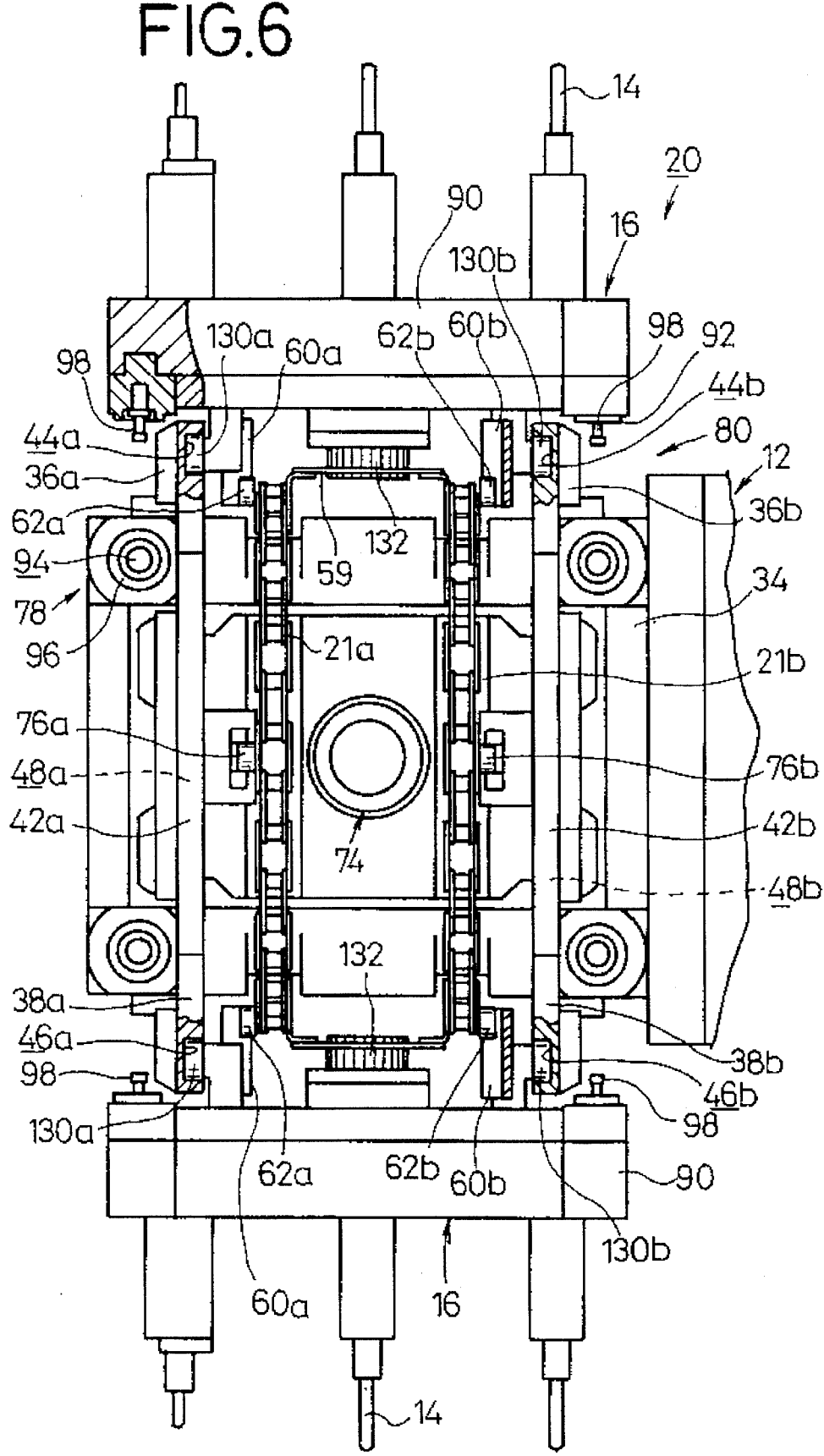
FIG. 6 is a side elevational view of the annular feed passageway and the clamp mechanism.

As shown in FIGS. 4 through 6, the annular feed passageway 18 is mounted on a block 34 projecting horizontally from an end of the side 12a of the column 12. As shown in FIG. 1, the column 12 is mounted on a base 26 having a frame 28 which surrounds a lower portion of the column 12. The frame 28 has on its bottom a slanted surface 30 that is inclined downwardly in a direction from the column 12 toward the actuator mechanism 19. The slanted surface 30 has an end which terminates below the annular feed passageway 18 and which is connected to a drain fluid receiver 32.

The annular feed passageway 18 has a pair of upper fixed rails (fixed guide members) 36a, 36b and a pair of lower fixed rails (fixed guide members) 38a, 38b which extend parallel to each other and are spaced vertically from each other, and a pair of arcuate movable rails (movable guide members) 42a, 42b which can interconnect ends of the upper and lower fixed rails 36a, 36b and 38a, 38b near the machining position (in the direction indicated by the arrow $A_1$), the arcuate movable rails 42a, 42b being movable back and forth horizontally.

As shown in FIG. 6, the upper fixed rails 36a, 36b, the lower fixed rails 38a, 38b, and the arcuate movable rails 42a, 42b have respective guide grooves 44a, 44b, respective guide grooves 46a, 46b, and respective guide grooves 48a, 48b defined in confronting vertical surfaces thereof. The upper fixed rails 36a, 36b have respective recesses 50a, 50b (see FIG. 4) defined in upper surfaces thereof near the other ends thereof.

As shown in FIG. 5, a rotary actuator 51 is mounted on end portions of the upper and lower fixed rails 36b, 38b near the recesses 50a, 50b, and a rotatable shaft 52 is operatively coupled to the rotary actuator 51 transversely to the axis thereof. As shown in FIG. 4, the rotatable shaft 52 is rotatably supported by attachments 54a, 54b, and sprockets 56a, 56b are fixedly mounted on the rotatable shaft 52. The chains 21a, 21b are trained around the sprockets 56a, 56b, and held by respective chain guides 58a, 58b which are mounted on the attachments 54a, 54b and the block 34. The chain guides 58a, 58b are vertically spaced from each other and extend parallel to each other, and are arcuately curved near the machining position. The chains 21a, 21b are interconnected by coupling plates 59. A plurality of feed rollers 62a, 62b (see FIGS. 5 and 6) are mounted on the chains 21a, 21b for engagement with hooks (engaging members) 60a, 60b on the multispindle heads 16.

Figure 7:
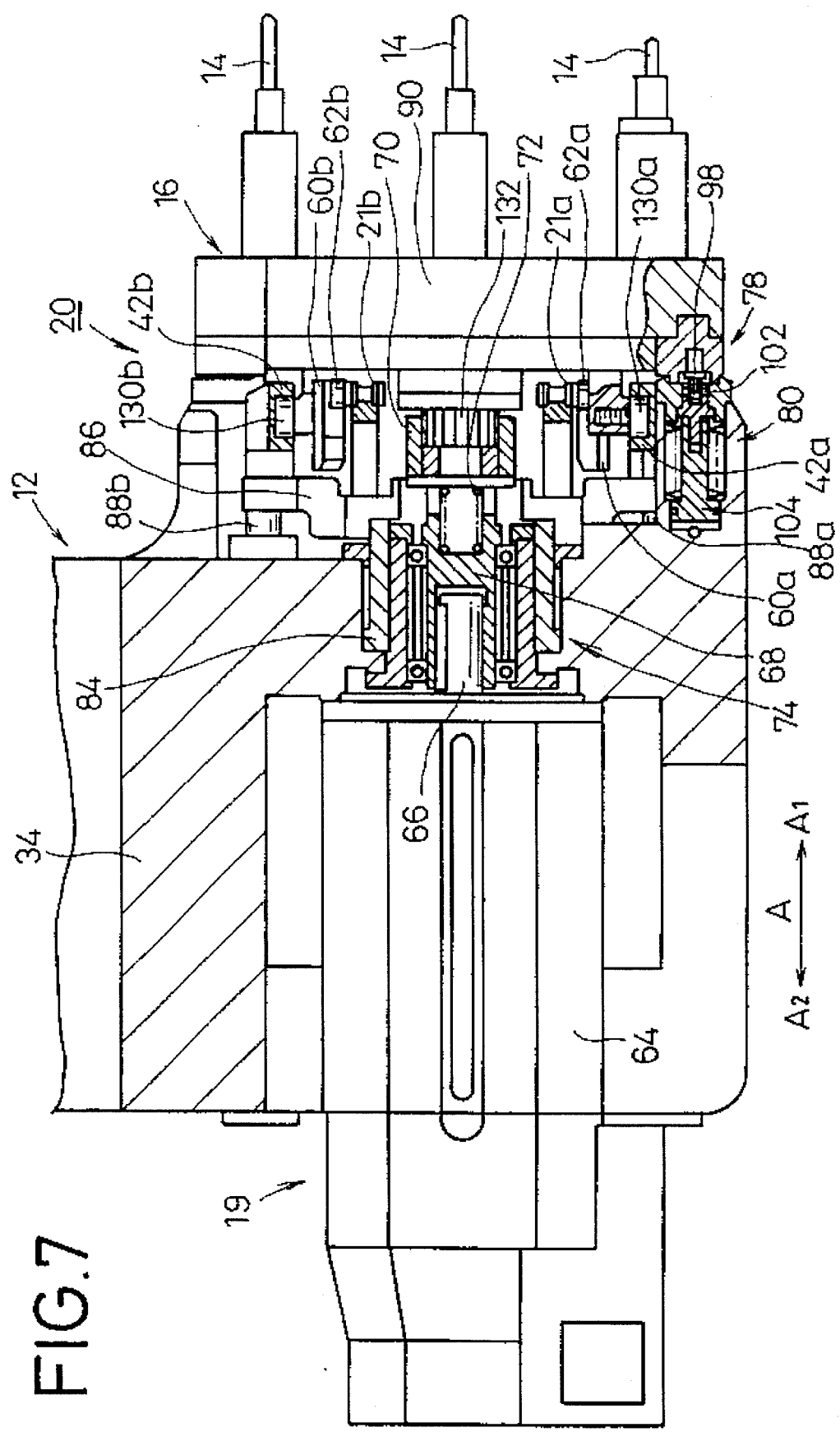
FIG. 7 is an enlarged fragmentary horizontal cross-sectional view of the clamp mechanism.

As shown in FIG. 7, the actuator mechanism 19 comprises a rotary actuator 64 fixed to the block 34 and having a rotatable shaft 66 to which an intermediate shaft 68 is connected. A spline clutch 70 is axially movably mounted on the intermediate shaft 68 with a spring 72 acting therebetween. When the spline clutch 70 engages a splined rotatable shaft 132 (described later on) of a multispindle-head 16 in the machining position, the tools 14 of the multispindle-head 16 can be rotated in unison with each other by the rotary actuator 64.

Figure 8:
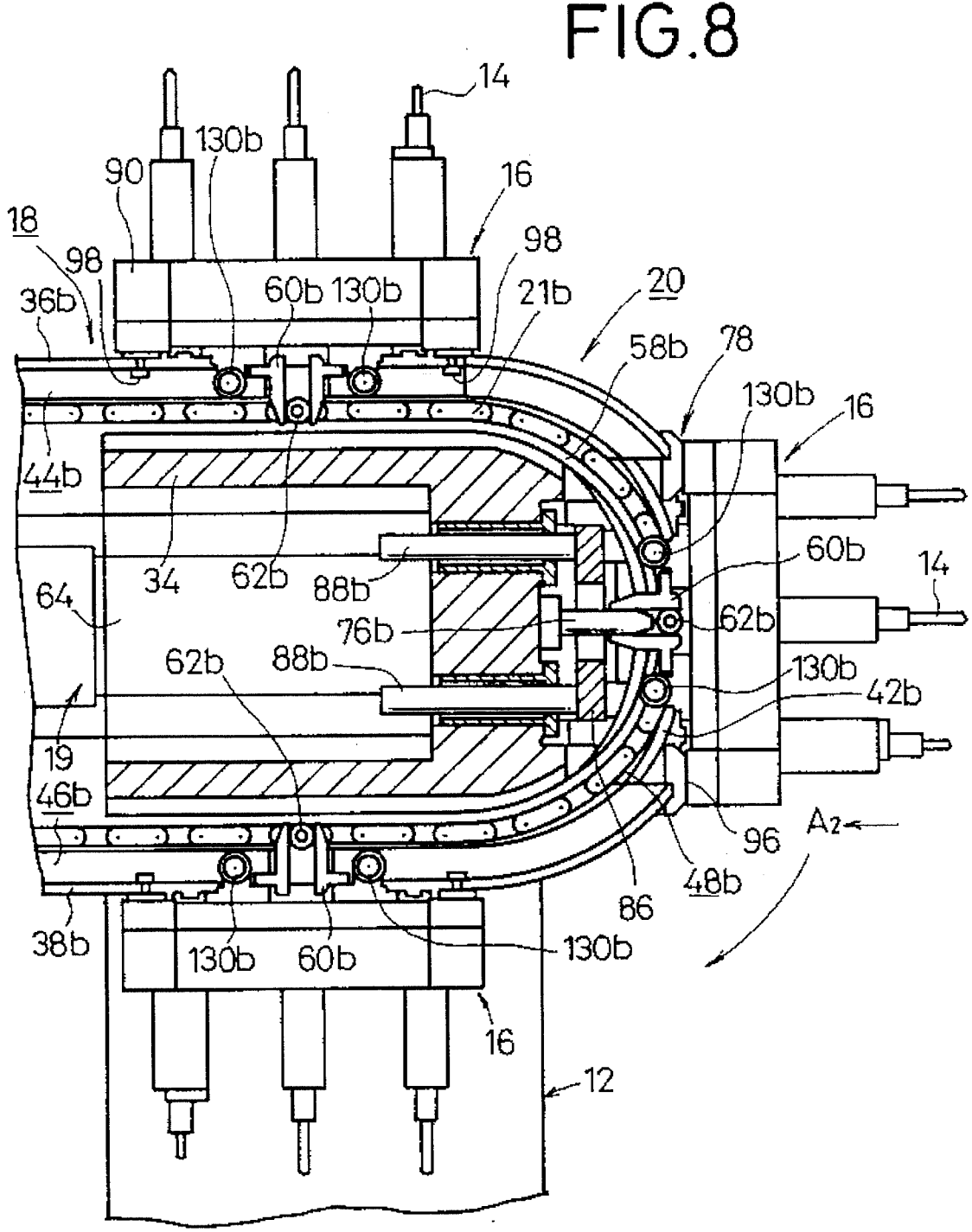
FIG. 8 is an enlarged fragmentary vertical cross-sectional view of the clamp mechanism.

As shown in FIGS. 6 through 8, the clamp mechanism 20 has a cylinder unit 74 for moving the movable rails 42a, 42b inwardly out of and outwardly into the annular feed passageway 18, a pair of temporary positioning pins (temporary positioning means) 76a, 76b for engaging the hooks 60a, 60b of the multispindle-head 16 to temporarily position the multispindle-head 16 when the movable rails 42a, 42b are moved inwardly out of the annular feed passageway 18 by the cylinder unit 74, a taper means 78 for centering and positioning the multispindle-head 16 with respect to the column 12, and a stud pulling means 80 for securing the multispindle-head 16 to the column 12.

The cylinder unit 74 has a ring-shaped piston 84 disposed coaxially with the intermediate shaft 68 coupled to the rotary actuator 64. The ring-shaped piston 84 can be moved back and forth in the directions A under a fluid pressure. A coupling plate 86 is fixed to the distal end of the piston 84, and a pair of guide bars 88a, 88b slidably supported in the block 34 is mounted on the coupling plate 86 (see FIG. 8).

Figure 9:
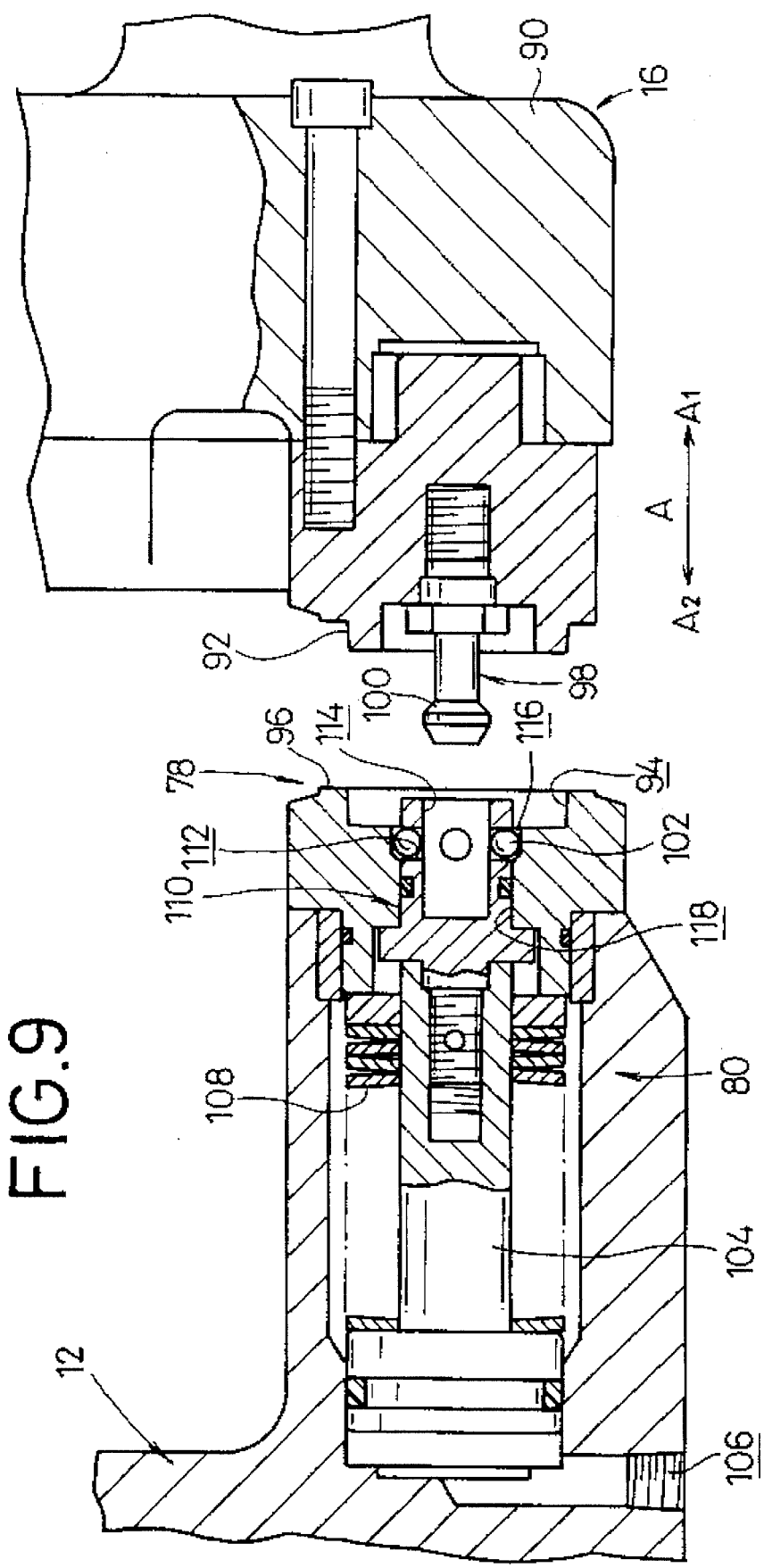
FIG. 9 is an enlarged fragmentary vertical cross-sectional view of a taper means and a stud pulling means of the clamp mechanism.
Figure 10:
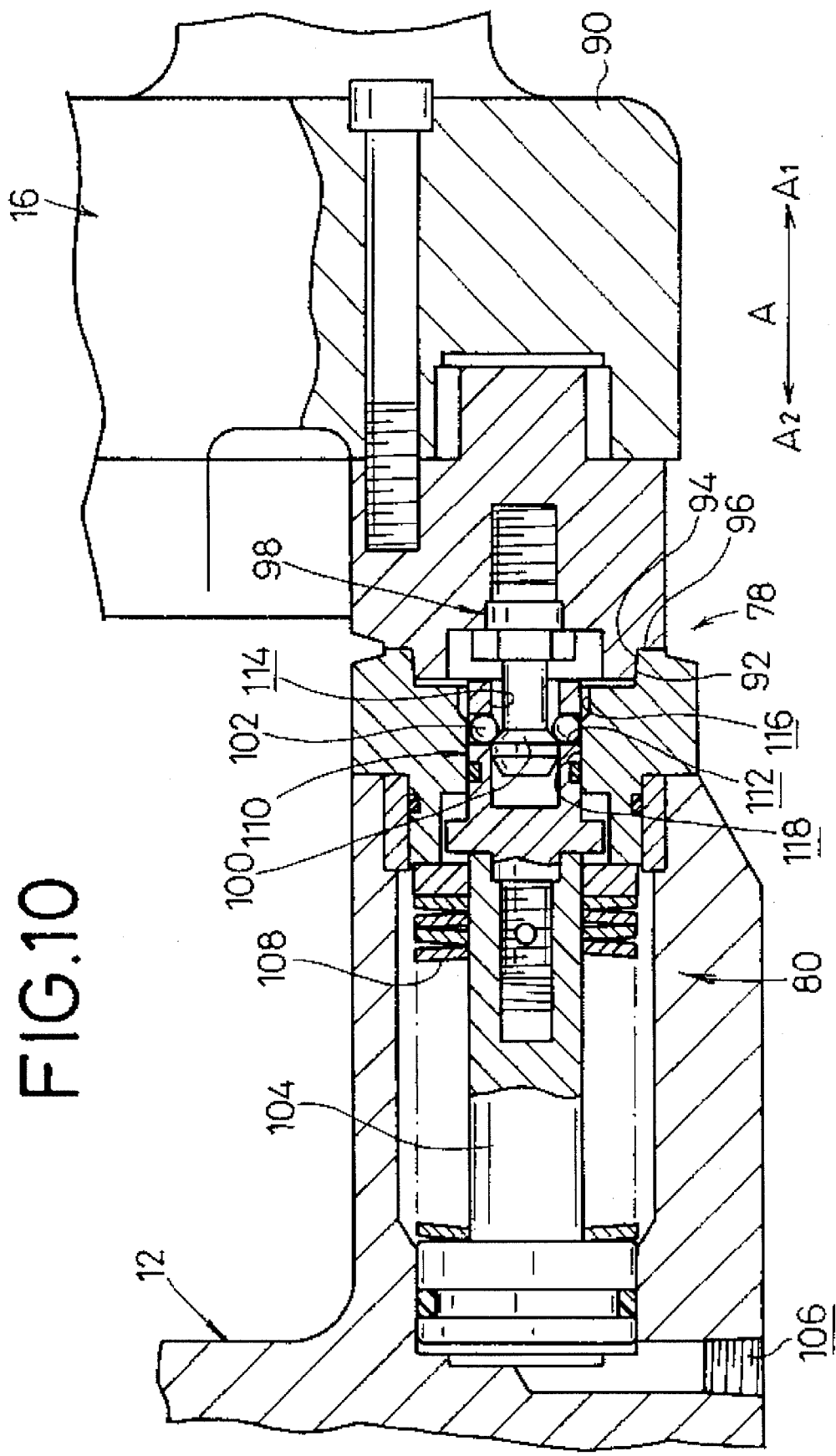
FIG. 10 is an enlarged fragmentary vertical cross-sectional view of the taper means and the stud pulling means as they are coupled to each other.

As shown in FIGS. 6, 9, and 10, the taper means 78 comprises a plurality of tapered portions 92 disposed on respective four corners of a rear surface of a housing 90 of the multispindle-head 16 which is opposite to a front surface thereof with the tools 14 mounted thereon, a plurality of tapered holes 94 defined in the column 12 for receiving the respective tapered portions 92 in fitting relation thereto, and a plurality of positioning seats 96 disposed around respective open ends of the tapered holes 94.

As shown in FIGS. 9 and 10, the stud pulling means 80 comprises a plurality of pull studs 98 mounted on the housing 90 in coaxial relation to the respective tapered portions 92 of the multispindle-head 16, a plurality of sets of clamp balls 102 engageable with respective necks 100 of the pull studs 98, and a plurality of pistons 104 for moving the clamp balls 102 radially of the pull studs 98. Each of the pistons 104 is disposed in the column 12. When oil under pressure is supplied from a port 106, the piston 104 is pressed toward the multispindle-head 16 in the direction indicated by the arrow $A_a$. However, the piston 104 is normally biased to move away from the multispindle-head 16 in the direction indicated by the arrow $A_2$ under the resiliency of a spring assembly 108.

A cylindrical ball holder 110 is coaxially coupled to the distal end of the piston 104. The cylindrical ball holder 110 has a plurality of radially through holes 112 defined in its cylindrical wall at circumferentially spaced angular intervals and held in communication with an insertion hole 114 defined centrally in the cylindrical ball holder 110. The clamp balls 102 are radially movably fitted in the respective radially through holes 112. The column 12 has a release hole 116 and a clamp hole 118 which are defined therein coaxially with the tapered hole 94 in communication therewith. The clamp hole 118 is smaller in diameter than the release hole 116. The release hole 116 serves to release the clamp balls 102 from the neck 100 of the pull stud 98. The clamp hole 118 serves to press the clamp balls 102 against the neck 100.

As shown in FIGS. 6 and 8, two pairs of guide rollers 130a, 130b are rotatably mounted on the rear surface of the housing 90 of each of the multispindle heads 16 for rolling engagement in the guide grooves 44a, 44b, 46a, 46b, and 48a, 48b of the upper fixed rails 36a, 36b, the lower fixed rails 38a, 38b, and the arcuate movable rails 42a, 42b. The hooks 60a, 60b which can grip the feed rollers 62a, 62b of the chains 21a, 21b and engage the temporary positioning pins 76a, 76b are fixedly positioned between the guide rollers 130a and the guide rollers 130b. A splined rotatable shaft 132 is disposed substantially centrally on the rear surface of the housing 90 of each of the multispindle heads 16 for meshing engagement with the spline clutch 70 to rotate the tools 14 in unison with each other in the machining position.

As shown in FIGS. 1 and 3, a pair of vertically spaced horizontal guide rails 140a, 140b is mounted on the side 12a of the column 12, and a rotary actuator 142 is mounted on the column 12 adjacent to the lower guide rail 140b. The rotary actuator 142 has a rotatable shaft to which there is coaxially connected a ball screw 144 extending in the directions A and held in mesh with a nut 146 mounted on the jig table 22 which is slidably supported on the guide rails 140a, 140b.

The jig table 22 lies in a vertical plane, and a drive motor 148 for rotating the rotary jig 24 is supported on the side 12a of the column 12. The rotary jig 24 has an attachment plate 150 projecting horizontally for holding and positioning the workpiece W.

As shown in FIG. 2, a stock device 160 is disposed on the base 26 parallel to the annular feed passageway 18. The stock device 160 serves to circulatingly feed a plurality of multispindle heads 16. The stock device 160 is of the same structure as the annular feed passageway 18 and hence will not be described in detail below.

An automatic multispindle-head exchanger mechanism 170 is disposed between a multispindle-head changing position 162 on the stock device 160 and the recesses 50a, 50b of the upper fixed rails 36a, 36b for automatically exchanging multispindle heads 16 of the annular feed passageway 18 and multispindle heads 16 of the stock device 160.

Operation of the multispindle-head machine tool 10 will be described below.

After the workpiece W is held by the attachment plate 150 of the rotary jig 24, the workpiece W is adjusted into a desired machining position and attitude by the jig table 22. Specifically, as shown in FIG. 1, the rotary actuator 162 is energized to rotate the ball screw 144 about its own axis for thereby moving the jig table 22 in the directions A along the guide rails 140a, 140b. The drive motor 148 is also energized to rotate the rotary jig 24 to bring the attachment plate 150 into a desired angular position, for thereby adjusting the position and attitude of the workpiece W.

As shown in FIG. 7, the rotary actuator 64 of the actuator mechanism 19 is energized to cause the rotatable shaft 66 to rotate the intermediate shaft 68. The splined rotatable shaft 132 meshing with the spline clutch 70 is rotated to rotate the tools 14 of the multispindle-head 16 in the machining position in unison with each other through a train of gears (not shown). The workpiece W is now machined by the tools 14.

When the multispindle-head 16 used to machine the workpiece W in the machining position is to be replaced with another multispindle-head 16, the rotary actuator 64 is deenergized, and oil under pressure is supplied into the ports of the clamp mechanism 20. As shown in FIG. 10, each piston 104 is moved in the direction $A_1$ under the oil pressure against the bias of the spring assembly 108, and the cylindrical ball holder 110 coupled to the piston 104 is also moved in the direction $A_1$. As the cylindrical ball holder 110 is moved in the direction $A_1$, the clamp balls 102 fitted in the holes 112 are moved radially inwardly from the clamp hole 118 into the release hole 116, and released from the neck 100 of the pull stud 98. The pull stud 98 is now unclamped.

Figure 11:
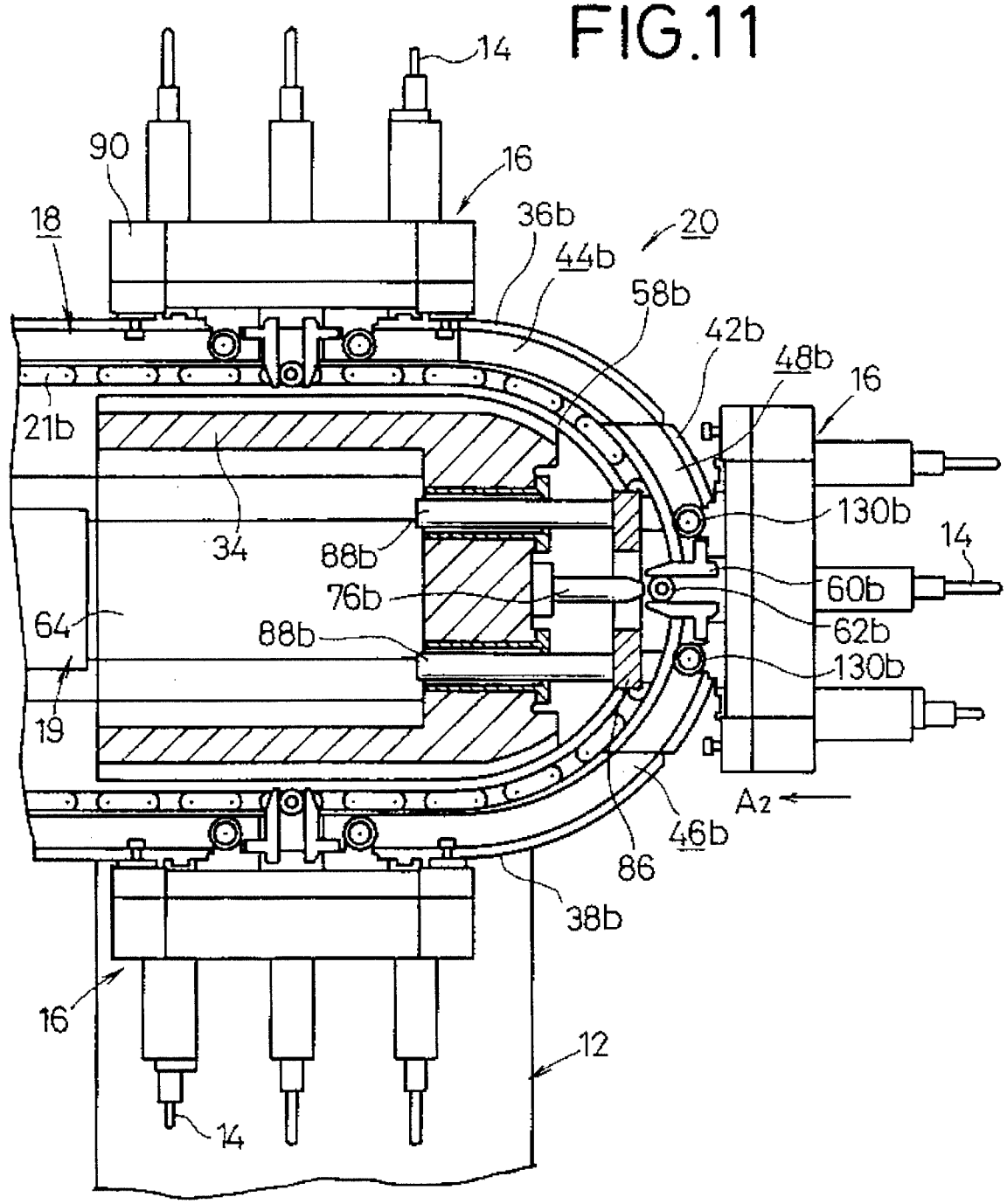
FIG. 11 is an enlarged fragmentary vertical cross-sectional view showing the manner in which the clamp mechanism operates.

The piston 84 of the cylinder unit 74 is moved in the direction $A_1$ (FIG. 7) under a fluid pressure. The movable rails 42a, 42b, which are coupled to the piston 84 by the coupling plate 86, are also moved in the direction $A_1$ while being guided by the guide bars 88a, 88b, until the ends of the movable rails 42a, 42b are aligned with the ends of the upper and lower fixed rails 36a, 36b and 38a, 38b as shown in FIG. 11. The annular feed passageway 18 is completed, and the hooks 60a, 60b are spaced from the temporary positioning pins 76a, 76b.

When the rotary actuator 51 is energized to rotate the rotatable shaft 52, the sprockets 56a, 56b are rotated in the direction indicated by the arrow B in FIG. 4, thus moving the chains 21a, 21b engaging the sprockets 56a, 56b also in the direction B. When the other multispindle-head 16 to be used next arrives at the machining position, i.e., is brought onto the movable rails 42a, 42b, the rotary actuator 51 is de-energized.

After the other multispindle-head 16 has been brought onto the movable rails 42a, 42b, the piston 84 of the cylinder 74 is moved in the direction $A_2$ under a fluid pressure. The movable rails 42a, 42b are also moved in the direction $A_2$, and the multispindle-head 16 with its guide rollers 130a, 130b engaging in the guide grooves 48a, 48b of the movable rails 42a, 42b is also moved in the direction $A_2$. The temporary positioning pins 76a, 76b are inserted respectively into the hooks 60a, 60b, thereby temporarily positioning the multispindle-head 16 as shown in FIG. 8.

As the multispindle-head 16 is further moved in the direction $A_2$, each of the pull studs 98 on the respective four corners of the multispindle-head 16 is inserted into the insertion hole 114 in the corresponding cylindrical ball holder 110. At this time, the cylindrical ball holder 110 is held in the position shown in FIG. 9 under the oil pressure supplied into the port 106. The pull stud 98 is therefore reliably inserted into the insertion hole 114 without being blocked by the clamp balls 102. When the supply of the oil pressure to the port 106 is stopped, the cylindrical ball holder 110 is moved with the piston 104 in the direction $A_2$ under the resiliency of the spring assembly 108, causing the inner circumferential surface of the clamp hole 118 to engage the peripheral surfaces of the clamp balls 102 which then engage and press the neck 100 of the pull stud 98 radially inwardly.

At this time, the tapered portions 92 on the respective four corners of the multispindle-head 16 engage in the respective tapered holes 94 in the column 12, thus centering the multispindle-head 16 with respect to the column 12. When the tapered portions 92 are fitted in the respective tapered holes 94, end surfaces of the tapered portions 92 abut against with the respective positioning seats 96, thereby positioning multispindle-head 16 with respect to the column 12.

The multispindle-head 16 is now positioned and centered highly accurately and firmly with respect to the column 12 by the clamp mechanism 20. At the same time, the splined rotatable shaft 132 of the multispindle-head 16 meshes with the spline clutch 70. When the rotary actuator 64 of the actuator mechanism 19 is energized, the workpiece W is machined by the tools 14 of the multispindle-head 16 which is newly positioned in the machining position.

In this embodiment, the plural multispindle heads 16 are circulatingly fed along the annular feed passageway 18 by the chains 21a, 21b. When a desired multispindle-head 16 is positioned on the movable rails 42a, 42b, the cylinder unit 74 of the clamp mechanism 20 is actuated to move the movable rails 42a, 42b toward the column 12 inwardly of the annular feed passageway 18. At this time, the hooks 60a, 60b engaging the chains 21a, 21b first move inwardly in unison with the multispindle-head 16, and are engaged by the temporary positioning pins 76a, 76b, thereby temporarily positioning the multispindle-head 16. Then, as the movable rails 42a, 42b move inwardly, the multispindle-head 16 is centered by the taper means 78 and secured to the column 12 by the stud pulling means 80.

Therefore, a desired multispindle-head 16 is not required to be taken out of the annular feed passageway 18 before it is positioned in the machining position, but can be positioned in the machining position while the hooks 60a, 60b of the desired multispindle-head 16 remain in engagement with the chains 21a, 21b. Accordingly, the desired multispindle-head 16 can quickly and easily be brought into the machining position, and a plurality of multispindle heads 16 can be carried by the annular feed passageway 18 for use in a wide variety of different machining operations.

The tapered portions 92 of the taper means 78 and the pull studs 98 of the stud pulling means 80 are located respectively at the four corners of the multispindle heads 16. Each of the multispindle heads 16 can be positioned highly accurately and firmly with respect to the column 12 by the taper means 78 and the stud pulling means 80. Even though the plural multispindle heads 16 are circulated and fed by the chains 21a, 21b, a desired one of the multispindle heads 16 can be positioned highly accurately in the machining position. Nevertheless, the multispindle-head machine tool 10 is relatively simple in structure and small in size as a whole.

Furthermore, the multispindle heads 16 are circulated to be fed in a vertical plane by the upper fixed rails 36a, 36b, the lower fixed rails 38a, 38b extending parallel thereto and spaced vertically therefrom, and the movable rails 42a, 42b which can be joined to the upper and lower fixed rails 36a, 36b and 38a, 38b. Since a horizontal space required to stock the multispindle heads 16 is much smaller than the conventional arrangement in which multispindle heads are circulatingly fed in a horizontal plane, the space occupied by the multispindle-head machine tool 10 is greatly reduced.

The multispindle-head 16 which has completed a machining process on the workpiece W is moved from the movable rails 42a, 42b onto the lower fixed rails 38a, 38b. When the multispindle-head 16 is moved onto the lower fixed rails 38a, 38b, the tools 14 mounted thereon are oriented downwardly. Accordingly, chips and/or a machining fluid that has been applied to the multispindle-head 16 drop by gravity along the downwardly directed tools 14, and hence is reliably removed from the multispindle-head 16. The removed chips and/or the machining fluid removed from the multispindle-head 16 is received by and flows along the slanted surface 30 of the frame 28 into the drain fluid receiver 32.

The jig table 22 is horizontally movable back and forth while being held in a vertical attitude by the vertically spaced guide rails 140a, 140b that are fixed to the side 12a of the column 12. This arrangement is effective to prevent chips and/or a machining fluid from being deposited on the jig table 22 and sliding portions thereof. The jig table 22 is thus allowed to move back and forth in the directions A highly accurately at all times, and does not need to be cleaned at frequent intervals.

The actuator unit and the jig table 22 are mounted on the same column 12. Therefore, the relative positions of the actuator unit and the jig table 22 remain unchanged when cooled by the machining fluid supplied during a machining process, so that the workpiece W can be machined highly accurately at all times.

Figure 12:
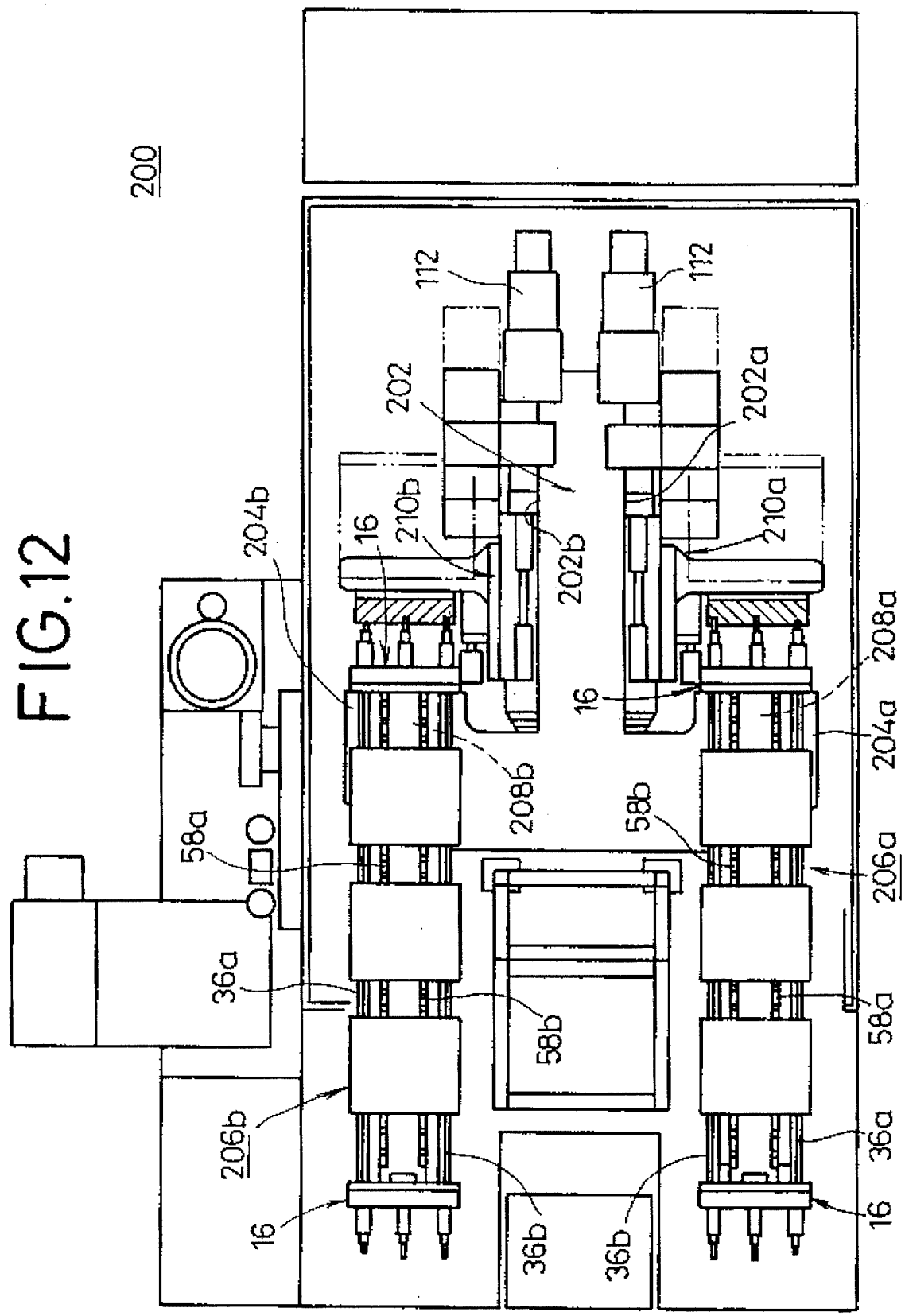
FIG. 12 is a schematic plan view of a multispindle-head machine tool according to a second embodiment of the present invention.

2nd Embodiment:

FIG. 12 shows a multispindle-head machine tool 200 according to a second embodiment of the present invention. Those parts of the multispindle-head machine tool 200 which are identical to those of the multispindle-head machine tool 10 according to the first embodiment are denoted by identical reference characters, and will not be described in detail below.

The multispindle-head machine tool 200 has a column 202 including a pair of blocks 204a, 204b projecting outwardly from opposite sides 202a, 202b of the column 202. The blocks 204a, 204b support respective annular feed means 206a, 206b and respective actuator units 208a, 208b. Jig tables 210a, 210b are mounted in a vertical attitude on the respective sides 202a, 202b for horizontal back-and-forth movement.

Since the annular feed means 206a, 206b, the actuator units 208a, 208b, and the jig tables 210a, 210b are mounted on the opposite sides of the single column 202, the multispindle-head machine tool 200 can machine two workpieces W simultaneously, and hence the efficiency of machining operation can easily be increased. The multispindle-head machine tool 200 can effectively be reduced in overall size as it employs the single column 202.

3rd Embodiment:

A multispindle-head machine tool 10 according to a third embodiment of the present invention will be described below with reference to FIGS. 13 through 16. The multispindle-head machine tool 10 according to the third embodiment differs from those of the first and second embodiments in that a feed mechanism is composed of a single chain, and an actuator mechanism for actuating the chain and a temporary positioning means for positioning a multispindle head in a machining position are accordingly different from those of the first and second embodiments. Those parts of the multispindle-head machine tool 10 according to the third embodiment which are identical to those of the multispindle-head machine tool 10 according to the first embodiment are denoted by identical reference characters, and will not be described in detail below.

Figure 13:
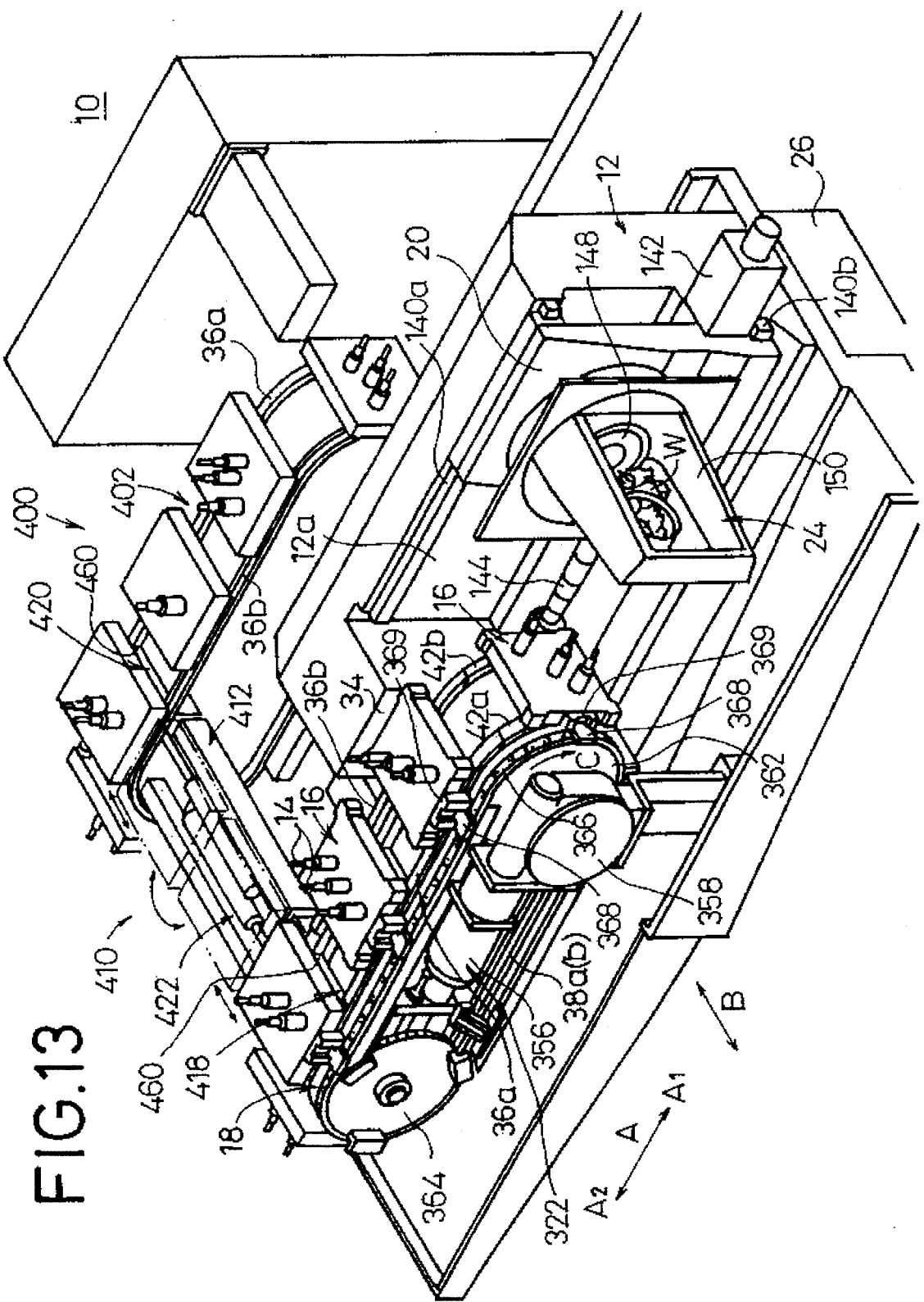
FIG. 13 is a schematic perspective view of a multispindle-head machine tool according to third and fourth embodiments of the present invention.

As shown in FIG. 13, the multispindle-head machine tool 10 has a feed mechanism 322 including a rotary actuator 356 disposed outside of an annular feed passageway 18 and extending in the directions A. A drive shaft 360 (see FIG. 15) extending in the directions indicated by the arrow B transverse to the directions A is connected to the rotary actuator 356 through a worm transmission means 358. A drive sprocket (toothed member) 362 is fixedly mounted on the drive shaft 360 outside of the annular feed passageway 18. A chain 366 (circulatory member) (see FIG. 13) is trained around the drive sprocket 362 and a driven sprocket 364 which is spaced from the drive sprocket 362 in the direction $A_2$. A plurality of feed fingers (engaging members) 368 are mounted at certain intervals on the chain 366. On the feed fingers 368, there are mounted a plurality of feed rollers 372 each for engagement in and out of a hook groove 370 defined in a hook 369 on one of multispindle heads 16, and a plurality of guide rollers 376 each for rolling contact with a pair of upper and lower chain guides 374 disposed parallel to the chain 366 (see FIG. 15).

Figure 14:
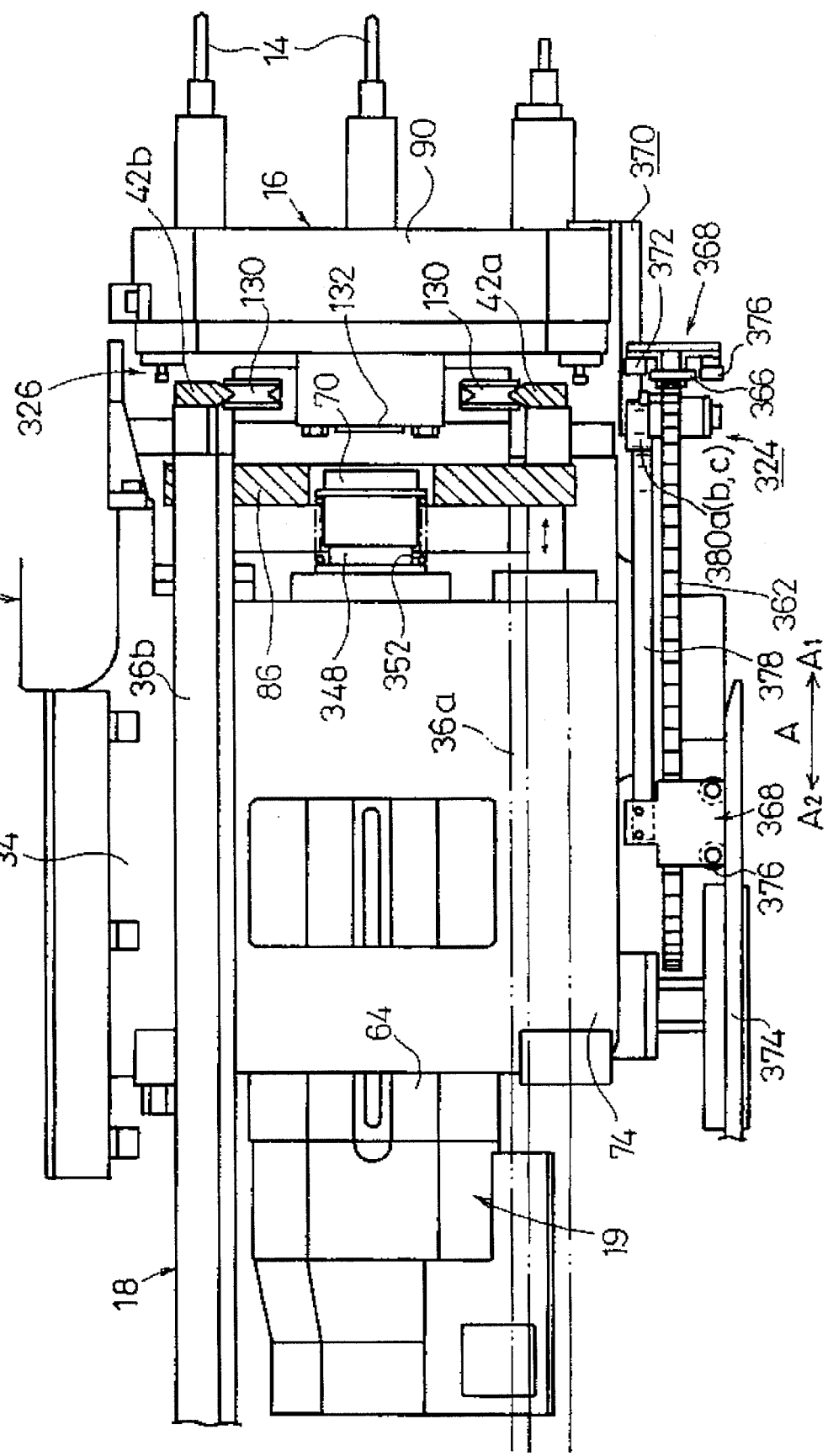
FIG. 14 is a plan view, partly in cross section, of the multispindle-head machine tool according to the third embodiment of the present invention.
Figure 15:
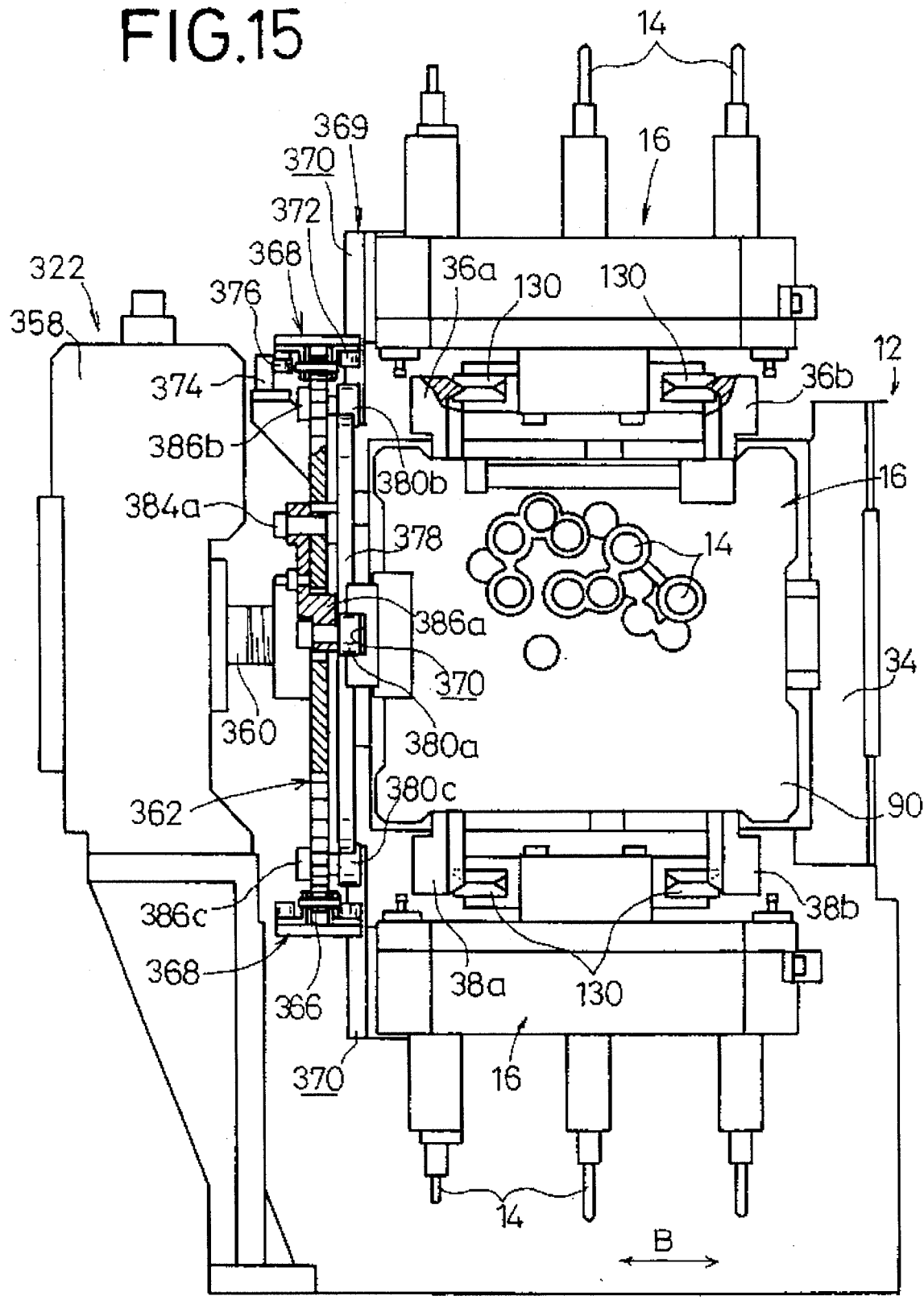
FIG. 15 is a side elevational view, partly in cross section, of the multispindle-head machine tool shown in FIG. 14.

As shown in FIGS. 14 through 16, a temporary positioning mechanism 324 comprises a cam plate 378 fixed to a block 34 of a column 12 near movable rails 42a, 42b, and a plurality of cam followers 380a, 380b, 380c swingably supported on a side of the drive sprocket 362 and held in contact with the cam plate 378 for fitting engagement, together with corresponding feed rollers 372, in the hook grooves 370 of corresponding multispindle heads 16 upon rotation of the drive sprocket 362. The hook groove 370 have spread ends near the cam followers 380a, 380b, 380c for smoothly receiving these cam followers 380a, 380b, 380c.

As shown in FIG. 16, the drive sprocket 362 has a plurality of openings 382a, 382b, 382c defined therein at equal angular intervals. Links 386a, 386b, 386c are swingably supported at ends thereof on respective support shafts 384a, 384b, 384c which are mounted on an outer surface of the drive sprocket 362 near the respective openings 382a, 382b, 382c. The other ends of the links 386a, 386b, 386c extend through the respective openings 382a, 382b, 382c and project beyond an inner surface of the drive sprocket 362. The cam followers 380a, 380b, 380c are rotatably supported on the projecting ends of the links 386a, 386b, 386c, respectively (see FIG. 15).

Springs 888a, 888b, 888c engage substantially central portions of the links 386a, 386b, 386c, respectively, for normally pulling the links 386a, 386b, 386c radially inwardly of the drive sprocket 362, i.e., toward the drive shaft 360, to hold the cam followers 380a, 380b, 380c in rolling contact with the outer peripheral edge of the cam plate 378. The center of the cam plate 378 is displaced out of alignment with the central axis of the drive shaft 360 in the direction $A_1$.

When the drive shaft 360 is rotated by the rotary actuator 356, the drive sprocket 362 is rotated in the direction indicated by the arrow C in FIG. 13, moving the chain 366 to circulate in the direction C in mesh with the drive sprocket 362 and the driven sprocket 364. When the chain 366 is moved in the direction C, the multispindle heads 16 which engage the feed fingers 368 on the chain 366 are also circulated to be moved in the direction C.

Upon rotation of the drive sprocket 362 in the direction C, as shown in FIG. 16, the cam followers 380a, 380b, 380c supported on the respective links 386a, 386b, 386c swingably supported on the outer surface of the drive sprocket 362 rotate in unison with the drive sprocket 362 while being held in rolling contact with the outer peripheral edge of the cam plate 378 at all times. Therefore, when a multispindle-head 16 is fed onto the drive sprocket 362 by the chain 366, one of the cam followers 380a, 380b, 380c, e.g., the cam follower 380a, engages in the hook groove 370 in which one of the feed fingers 368 engages.

The multispindle-head 16 is then guided by the cam follower 380a rotating with the drive sprocket 362 and the cam plate 378 so as to be temporarily positioned accurately with respect to the movable rails 42a, 42b, and is firmly supported by the cam follower 380a and the cam plate 378. The weight of the multispindle-head 16 is prevented from acting directly on the chain 366, which is hence prevented from stretching. If the multispindle-head 16 were guided only by the feed finger 268, it would not accurately be temporarily positioned with respect to the movable rails 42a, 42b due to a meshing error or play between the chain 366 and the drive sprocket 362. However, inasmuch as the multispindle-head 16 is temporarily positioned additionally by the temporary positioning mechanism 324 composed of the cam plate 378 and the cam followers 380a, 380b, 380c, the multispindle-head 16 is temporarily positioned highly accurately and reliably with respect to the movable rails 42a, 42b.

4th Embodiment:

A multispindle-head machine tool 10 according to a fourth embodiment of the present invention will be described below with reference to FIGS. 13 and 17 through 19. The multispindle-head machine tool 10 according to the fourth embodiment has an automatic multispindle head exchanger mechanism 410 different from the automatic multispindle-head exchanger mechanism 170 of the multispindle-head machine tool 10 according to the first embodiment. Those parts of the multispindle-head machine tool 10 according to the fourth embodiment which are identical to those of the multispindle-head machine tool 10 according to the first embodiment are denoted by identical reference characters, and will not be described in detail below.

As shown in FIG. 13, the multispindle-head machine tool 10 according to the fourth embodiment includes an automatic multispindle-head exchanger mechanism 410 disposed between a stock annular feed passageway 402 of a stock device 400 and an annular feed passageway 18 of the machine tool 10, for automatically exchanging multispindle heads 16.

As shown in FIGS. 13, 17, and 18, the automatic multispindle-head exchanger mechanism 410 comprises a turntable 412 disposed between the annular feed passageway 18 and the stock annular feed passageway 402, a first and second carriages 418, 420 disposed on respective opposite ends of the turntable 412 and having multispindle-head support rails (guide members) 414a, 414b and 416a, 416b which constitute part of the annular feed passageway 18 and the stock annular feed passageway 402, and a feed means 422 disposed on the turntable 412 for moving the first and second carriages 418, 420 which support respective multispindle heads 16 in different directions thereby to move the multispindle heads 16 simultaneously toward the center of the turntable 412.

The annular feed passageway 18 and the stock annular feed passageway 402 have respective storage sections 460 in which there are disposed fixed guide rails 424a, 424b and 426a, 426b (see FIGS. 17, 18, 19) positioned below upper fixed rails 36a, 36b and extending in the directions indicated by the arrows B (FIG. 18) across the upper fixed rails 36a, 36b.

The first carriage 418 has a plurality of rollers 428 engageable with the fixed guide rails 424a, 424b and 426a, 426b. When the first carriage 418 is positioned in each of the storage sections 460 of the annular feed passageway 18 and the stock annular feed passageway 402, the rails 414a, 414b of the first carriage 418 are aligned with the upper fixed rails 36a, 36b, making up the annular feed passageway 18 and the stock annular feed passageway 402. The second carriage 420 is of a structure identical to that of the first carriage 418, and its identical components are denoted by identical reference characters and will not be described in detail below.

The turntable 412 can be turned about its center by a hydraulic motor 430. The turntable 412 has a pair of parallel spaced guide rails 432a, 432b (see FIG. 17) which can be held in line with the fixed guide rails 424a, 424b and 426a, 426b of the annular feed passageway 18 and the stock annular feed passageway 402.

The feed means 422 comprises a pair of parallel cylinders 434a, 434b fixedly mounted on the turntable 412 and extending in different directions, respectively. The cylinders 434a, 434b have piston rods 436a, 436b extending in opposite directions therefrom and having projecting distal ends coupled to lower portions of the first and second carriages 418, 420, respectively, through respective attachment plates 438a, 438b.

The first and second carriages 418, 420 and the turntable 412 have positioning means 440 for positioning and holding multispindle heads 16 supported on the respective first and second carriages 418, 420 when the first and second carriages 418, 420 are fed.

As shown in FIG. 18, each of the positioning means 440 comprises a link-shaped engaging member 442 swingably mounted on one of the first and second carriages 418, 420 through a pivot 441, the link-shaped engaging member 442 having a distal end 444 that can be fitted in a hook 488 of a multispindle-head 16. The link-shaped engaging member 442 has on its opposite end a cam follower 446 held in sliding contact with a cam surface 448 disposed on one of opposite ends of the turntable 412 and inclined upwardly toward the center of the turntable 412. Each of the first and second carriages 418, 420 has a presser 450 which is normally biased by a spring (not shown) to press the link-shaped engaging member 442 in a direction to move the distal end 444 thereof out of the hook 488.

Operation of the automatic multispindle-head exchanger mechanism 410 in relation to the machine tool 10 will be described below.

When different workpieces W of many types are to be machined, a multispindle-head 16 mounted on the annular feed passageway 18 and a multispindle-head 16 mounted on the stock annular feed passageway 402 are exchanged with each other as follows:

On the annular feed passageway 18, the multispindle-head 16 which has been used is supported on the first carriage 418 positioned in the storage section 460. On the stock annular feed passageway 402, the multispindle-head 16 which is to be used is supported on the second carriage 420 positioned in the storage section 460. The cylinders 434a, 434b of the feed means 422 disposed on the turntable 412 are actuated to move the piston rods 436a, 436b inwardly, i.e., toward the center of the turntable 412. The first and second carriages 418, 420 are now moved from the fixed guide rails 424a, 424b and 426a, 426b onto the guide rails 432a, 432b toward the center of the turntable 412.

At this time, as shown in FIG. 18, the cam follower 446 of each of the positioning means 440 is lifted along the cam surface 448 of the turntable 412, and the link-shaped engaging member 442 which supports the cam follower 446 is turned in the direction indicated by the arrow D against the bias of the spring-loaded presser 450. The distal end 444 of the link-shaped engaging member 442 is then fitted into the hook 488 of the multispindle-head 16, which is positioned and held on the turntable 412 as indicated by the two-dot-and-dash lines in FIG. 18.

After the multispindle heads 16 have been fed to the center of the turntable 412, the turntable 412 is turned 180° by the hydraulic motor 430. Then, the cylinders 434a, 434b of the feed means 422 are actuated to move the piston rods 436a, 436b outwardly to move the multispindle-head 16 which has been used, in unison with the first carriage 418, onto the stock annular feed passageway 402, and also to move the multispindle-head 16 which is to be used, in unison with the second carriage 420, onto the annular feed passageway 18. The distal end 444 of the link-shaped engaging member 442 of each of the positioning means 440 is now displaced out of the hook 488 as indicated by the solid lines in FIG. 18.

When the chain 366 is subsequently circulated to move by the rotary actuator 356, the multispindle-head 16 on the second carriage 420 is transferred from the rails 416a, 416b of the second carriage 420 onto the upper fixed rails 36a, 36b by one of the feed fingers 368 on the chain 366.

In this embodiment, the first and second carriages 418, 420 constitute part of the annular feed passageway 18 and the stock annular feed passageway 402. The first and second carriages 418, 420, while supporting multispindle heads 16, are fed toward the center of the turntable 412 by the feed means 422, turned 180° by the turntable 412, and then fed to the stock annular feed passageway 402 and the annular feed passageway 18, respectively, by the feed means 422.

Therefore, a space required for the turntable 412 to turn therein is much smaller than with the conventional arrangement in which the multispindle heads 16 are turned after they have been taken upwardly from the annular feed passageway 18 and the stock annular feed passageway 402. Consequently, the automatic multispindle-head exchanger mechanism 410 can be reduced in size and simplified in structure in its entirety.

Because the multispindle heads 16 are fed toward the center of the turntable 412, it is possible to turn the turntable 412 at a relatively high speed even if the multispindle heads 16 are considerably heavy because the centers of gravity of the multispindle heads 16 are located near the center of turning movement of the turntable 412 and hence the inertia of the turntable 412 is reduced. This allows the multispindle heads 16 to be exchanged with each other quickly and efficiently.

Since the first and second carriages 418, 420 themselves constitute part of the annular feed passageway 18 and the stock annular feed passageway 402, the multispindle heads 16 can be exchanged essentially by moving the first and second carriages 418, 420 back and forth with the feed means 422 and turning the turntable 412. Such a simplified exchanging process is effective in reducing the overall size of the automatic multispindle-head exchanger mechanism 410 and speeding up the process of exchanging the multispindle heads 16.

Although certain preferred embodiments of the present invention has been shown and described in detail, it should be understood that various changes and modifications may be made therein without departing from the scope of the appended claims.

What is claimed is:

1. A multispindle-head machine tool comprising:
   a column;
   a plurality of multispindle heads each having a plurality of tools and an engaging member;
   an annular feed passageway supporting said multispindle heads for circulatory movement therealong, said annular feed passageway having a pair of upper and lower fixed guide members supported on said column, and a movable guide member movable back and forth horizontally for interconnecting ends of said upper and lower fixed guide members near a machining position;
   a rotary actuator;
   feed means disposed around said annular feed passageway and movable to circulate along said annular feed passageway by said rotary actuator for moving said multispindle heads along said annular feed passageway;
   an actuator unit mounted on said column in association with said movable guide member for positioning one of said multispindle heads which is held on said movable guide member in said machining position, and rotating the tools of said one of the multispindle heads; and
   a jig table mounted on a side of said column and horizontally movable back and forth, said jig table having an attachment jig for supporting a workpiece to be machined by the tools of said one of the multispindle heads.

2. A multispindle-head machine tool according to claim 1, wherein said feed means comprises:
   a toothed member rotatable by said rotary actuator;
   a circulatory member movable to circulate in engagement with said toothed member; and
   a plurality of feed members engageable with the respective engaging members of said multispindle heads for moving the multispindle heads to circulate said feed members disengageable from the engaging members.

3. A multispindle-head machine tool according to claim 1, wherein said actuator unit comprises:
   temporary positioning means for engaging the engaging member of said one of the multispindle heads to temporarily position said one of the multispindle heads in said machining position when said movable guide is horizontally moved inwardly out of said annular feed passageway.

4. A multispindle-head machine tool according to claim 3, wherein said temporary positioning means comprises:
   a temporary positioning pin fixed to said column near said movable guide member for engagement with the engaging member of said one of the multispindle heads when said one of the multispindle heads is moved in unison with said movable guide member inwardly out of said annular feed passageway.

5. A multispindle-head machine tool according to claim 3, wherein said temporary positioning means comprises:
   a cam plate fixed to said column near said movable guide member; and
   a cam follower swingably supported on a side of said toothed member and held in contact with said cam plate for engaging the engaging member of said one of the multispindle heads when said toothed member rotates.

6. A multispindle-head machine tool according to claim 1, wherein said actuator unit comprises a clamp mechanism for securely positioning said one of the multispindle heads with respect to said column, said clamp mechanism comprising:
   a cylinder unit for moving said movable guide member inwardly out of and outwardly into said annular feed passageway;
   taper means for centering said one of the multispindle heads with respect to said column; and
   stud pulling means for fixing said one of the multispindle heads to said column.

7. A multispindle-head machine tool according to claim 6, wherein said taper means comprises a plurality of tapered portions disposed on respective four corners of a rear surface of said one of the multispindle heads opposite to a front surface thereof on which said tools are mounted, and a plurality of tapered holes defined in said column for receiving said tapered portions, respectively.

8. A multispindle-head machine tool according to claim 6, wherein stud pulling means comprises a plurality of studs disposed on respective four corners of a rear surface of said one of the multispindle heads opposite to a front surface thereof on which said tools are mounted, a plurality of sets of balls mounted in said column for engagement with respective necks of said studs, and a plurality of pistons for moving said sets of balls radially with respect to said studs, respectively.

9. A multispindle-head machine tool according to claim 1, wherein said jig table comprises a rotary base with said attachment jig mounted thereon, and a drive motor for rotating said rotary base to index said workpiece.

10. A multispindle-head machine tool according to claim 1, wherein two sets of said annular feed passageway, said feed means, said actuator unit, and said jig table are mounted symmetrically on opposite sides of said column.

11. A multispindle-head machine tool according to claim 1, further comprising:

a stock device having a stock annular feed passageway extending parallel to and substantially identical in structure to said annular feed passageway; and an automatic multispindle-head exchanger mechanism disposed between said annular feed passageway and said stock annular feed passageway for exchanging multispindle heads;

said automatic multispindle-head exchanger mechanism comprising:

a turntable disposed between said annular feed passageway and said stock annular feed passageway;

first and second carriages normally positioned at respective opposite ends of said turntable and serving as part of said annular feed passageway and said stock annular feed passageway, respectively, each of said first and second carriages having guide members for supporting a multispindle-head; and transfer means mounted on said turntable for simultaneously moving said first and second carriages with respective multispindle heads supported in different directions toward a center of said turntable.

12. A multispindle-head machine tool according to claim 11, wherein said automatic multispindle-head exchanger mechanism further comprises positioning means for positioning the multispindle heads supported on said first and second carriages when said first and second carriages are moved toward the center of said turntable by said transfer means, said positioning means comprising:

a hook mounted on each of the multispindle heads; and an engaging member mounted on each of said first and second carriages for engaging said hook in coaction with said turntable.

\* \* \* \* \*